United States Patent [19]

Ishima

[11] Patent Number: 4,467,183
[45] Date of Patent: Aug. 21, 1984

[54] LIQUID TEMPERATURE CONTROL APPARATUS COMPRISING INITIAL TEMPERATURE DEPENDENT HIGH POWER HEATER DRIVE

[75] Inventor: Kazumi Ishima, Tokyo, Japan

[73] Assignee: Ricoh Company, Ltd., Tokyo, Japan

[21] Appl. No.: 330,981

[22] Filed: Dec. 15, 1981

[30] Foreign Application Priority Data

| Dec. 19, 1980 | [JP] | Japan | 55-178788 |
| Dec. 19, 1980 | [JP] | Japan | 55-178789 |
| Dec. 19, 1980 | [JP] | Japan | 55-178790 |
| Dec. 19, 1980 | [JP] | Japan | 55-178791 |
| Dec. 19, 1980 | [JP] | Japan | 55-178792 |
| Dec. 19, 1980 | [JP] | Japan | 55-178793 |

[51] Int. Cl.$^3$ .............................. H05B 1/02
[52] U.S. Cl. .................... 219/497; 219/330; 219/508; 219/492; 236/46 R
[58] Field of Search ............. 219/501, 508, 330, 497, 219/492, 493, 494, 490, 510; 236/46 R, 46 F; 99/327, 332, 325 R

[56] References Cited

U.S. PATENT DOCUMENTS

| 3,869,597 | 3/1975 | Strange | 219/501 |
| 3,946,200 | 3/1976 | Juodikis | 219/497 |
| 4,225,777 | 9/1980 | Schindler | 219/508 |
| 4,300,037 | 11/1981 | Padden | 219/492 |
| 4,327,268 | 4/1982 | Frank | 219/497 |
| 4,363,957 | 12/1982 | Tachikawa et al. | 219/497 |

FOREIGN PATENT DOCUMENTS 2327246 12/1973 Fed. Rep. of Germany ...... 219/330

Primary Examiner—M. H. Paschall
Attorney, Agent, or Firm—David G. Alexander

[57] ABSTRACT

A liquid temperature control apparatus controllably heats a liquid from a temperature before a control to a desired reference temperature by varying the magnitude and/or application time period of a power for energizing a heater on the basis of a difference between a voltage corresponding to the actual temperature before a control and a reference voltage corresponding to the reference temperature. The parameter on which the magnitude and/or application time period of the heater power is to be based may be the sum of a first voltage differential between a voltage corresponding to the actual temperature before a control and the reference voltage and a second voltage differential between a voltage corresponding to an actual temperature after the start of a control and the reference voltage.

22 Claims, 90 Drawing Figures

Fig. 1 PRIOR ART
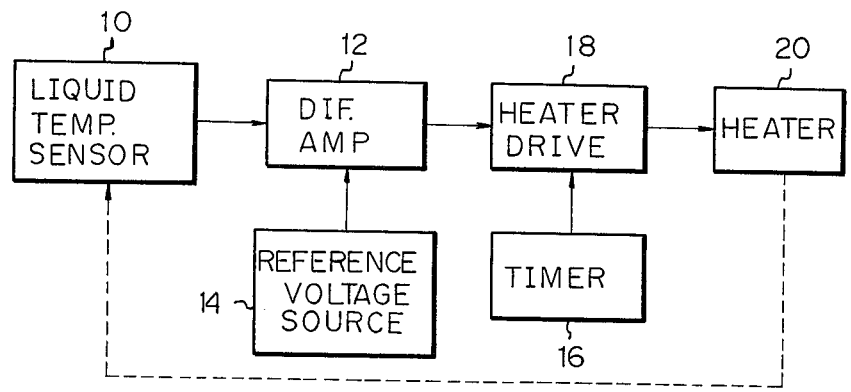
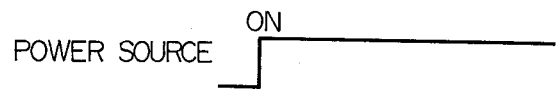
Fig. 2a PRIOR ART — POWER SOURCE
Fig. 2b PRIOR ART — TIMER
Fig. 2c PRIOR ART — HEATER DRIVE
Fig. 3 PRIOR ART
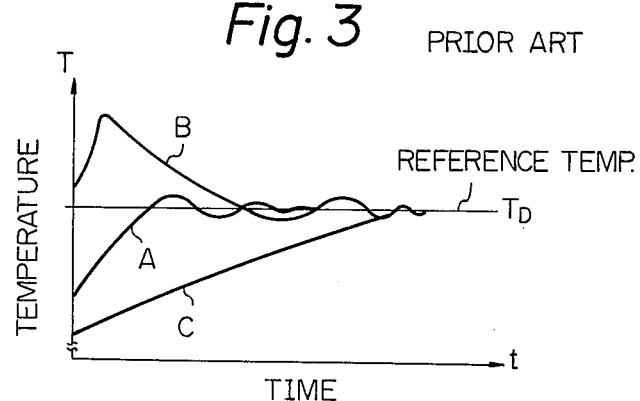

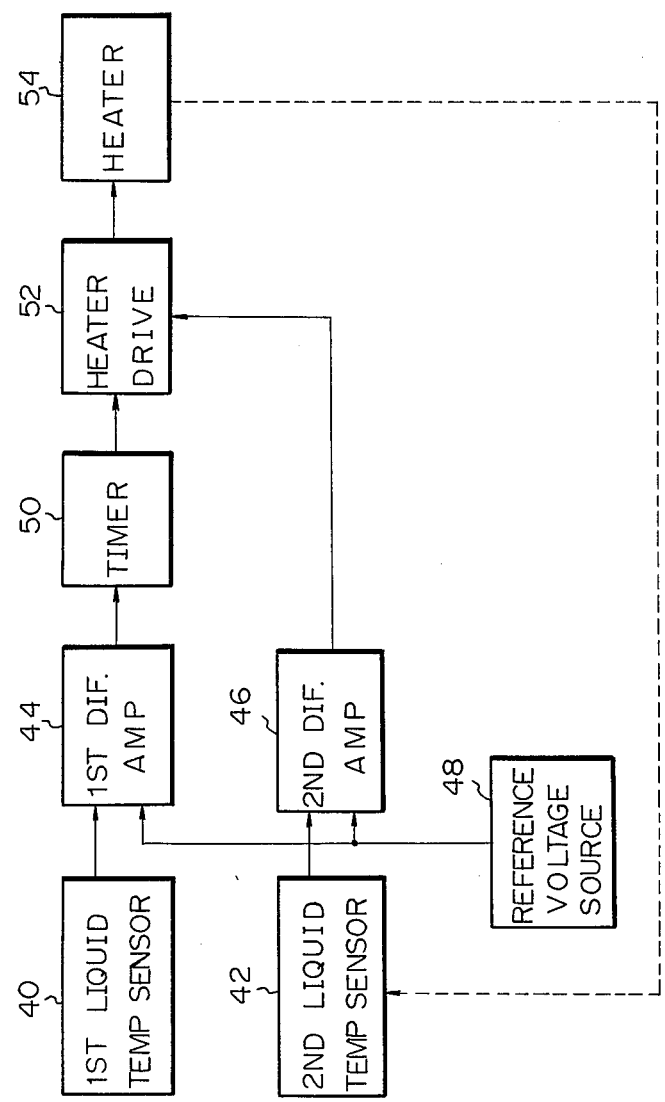

Fig. 5a   POWER SOURCE
Fig. 5b   TIMER
Fig. 5c   HEATER DRIVE

Fig. 6a   POWER SOURCE
Fig. 6b   TIMER
Fig. 6c   HEATER DRIVE

Fig. 7a   POWER SOURCE
Fig. 7b   TIMER
Fig. 7c   HEATER DRIVE

Fig.11a POWER SOURCE

Fig.11b TIMER

Fig.11c HEATER CURRENT

Fig.12a POWER SOURCE

Fig.12b TIMER

Fig.12c HEATER CURRENT

Fig.15a POWER SOURCE

Fig.15b TIMER

Fig.15c HEATER CURRENT

Fig.16a POWER SOURCE

Fig.16b HEATER CURRENT

Fig.16c 1ST(2ND) POWER AMP

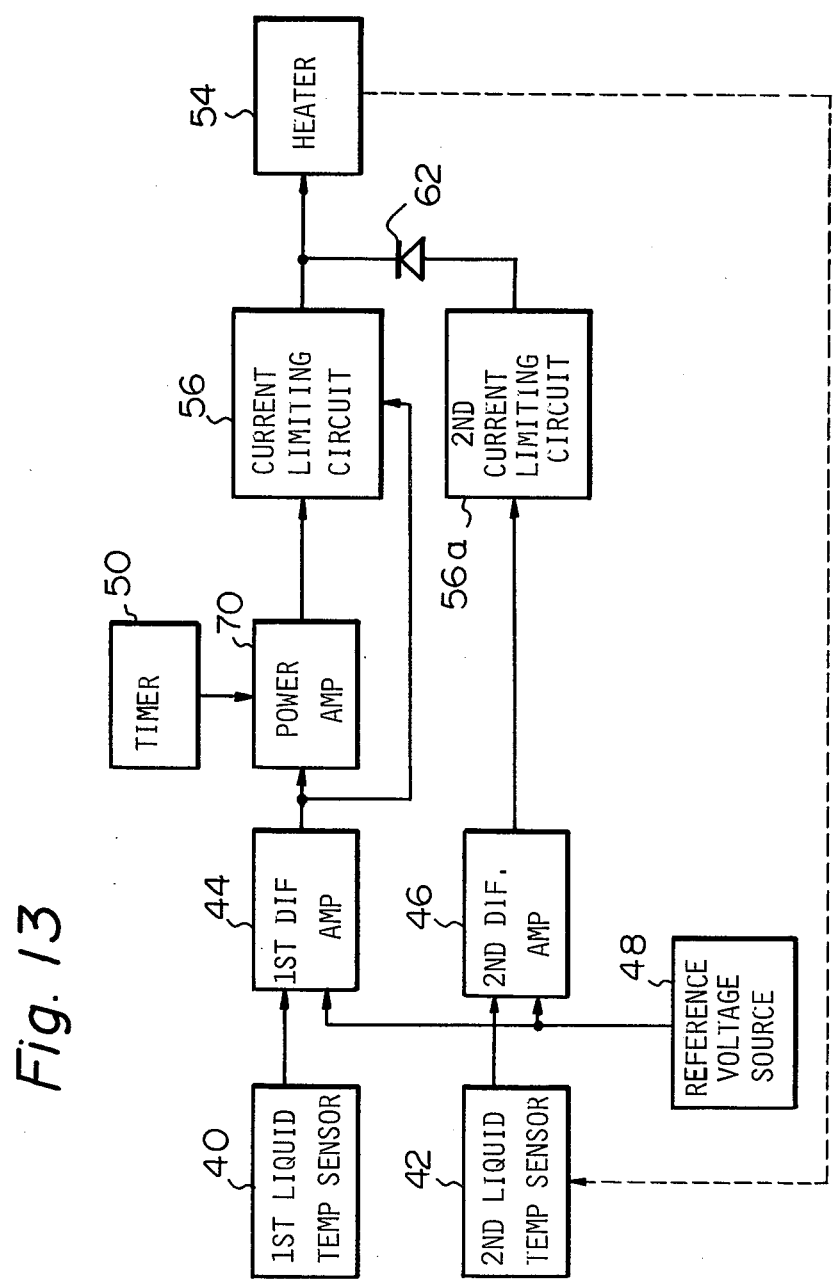

*Fig. 18a* POWER SOURCE 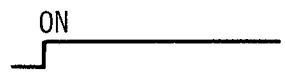
*Fig. 18b* TIMER 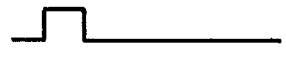
*Fig. 18c* POWER AMP 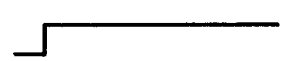
*Fig. 18d* HEATER CURRENT 
*Fig. 19a* POWER SOURCE 
*Fig. 19b* TIMER 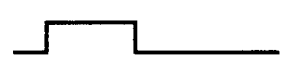
*Fig. 19c* POWER AMP 
*Fig. 19d* HEATER CURRENT 

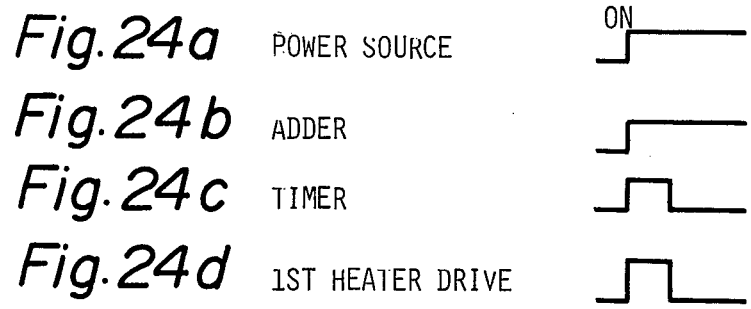
Fig.24a POWER SOURCE
Fig.24b ADDER
Fig.24c TIMER
Fig.24d 1ST HEATER DRIVE
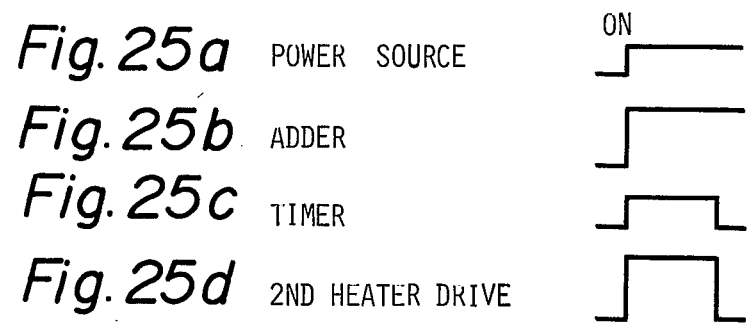
Fig.25a POWER SOURCE
Fig.25b ADDER
Fig.25c TIMER
Fig.25d 2ND HEATER DRIVE
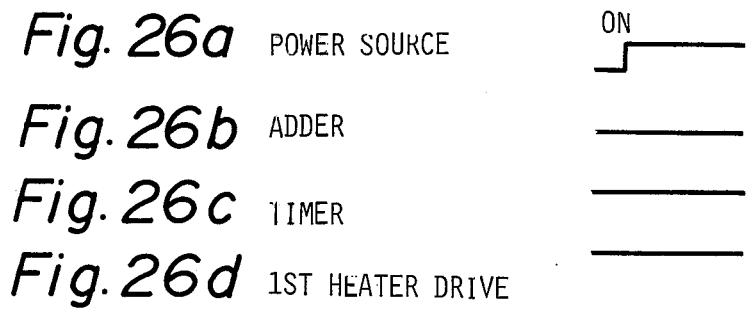
Fig.26a POWER SOURCE
Fig.26b ADDER
Fig.26c TIMER
Fig.26d 1ST HEATER DRIVE

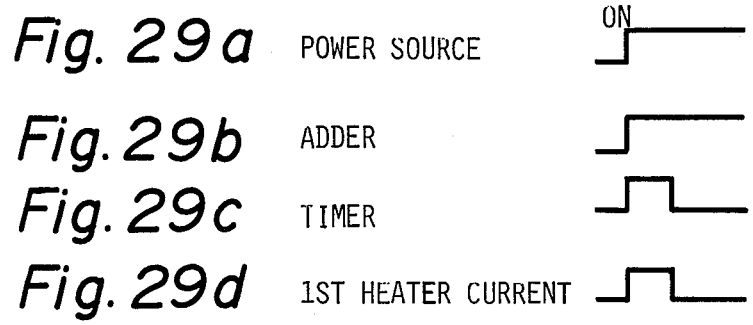
Fig. 29a  POWER SOURCE
Fig. 29b  ADDER
Fig. 29c  TIMER
Fig. 29d  1ST HEATER CURRENT
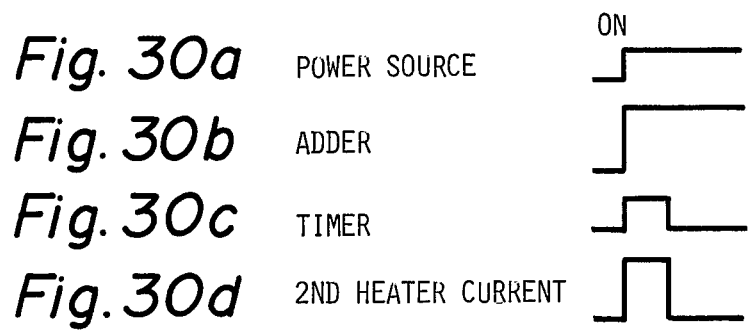
Fig. 30a  POWER SOURCE
Fig. 30b  ADDER
Fig. 30c  TIMER
Fig. 30d  2ND HEATER CURRENT

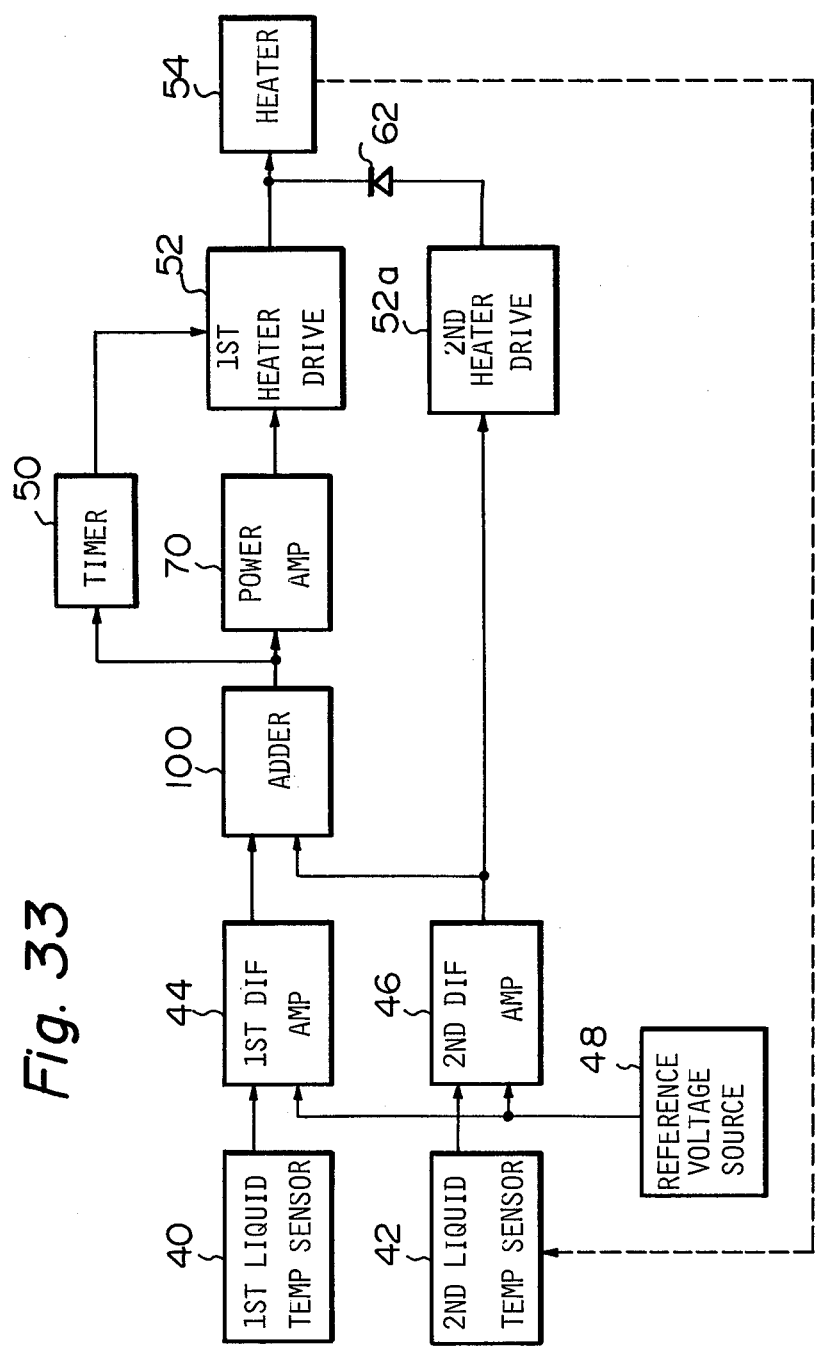

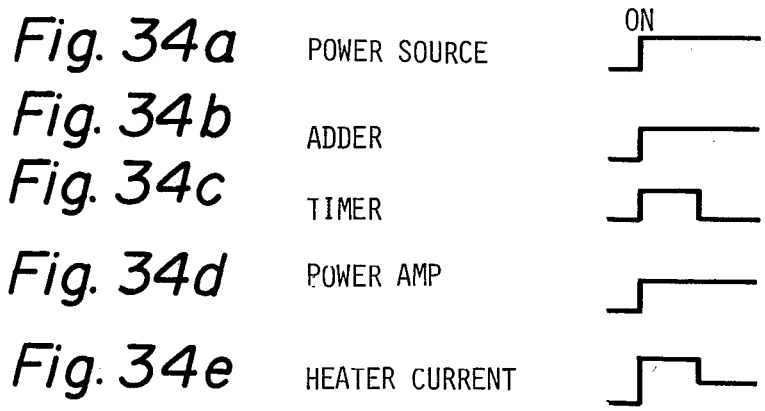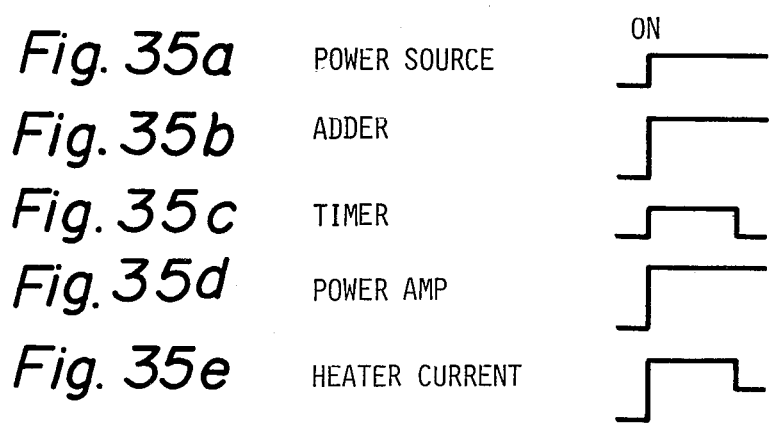

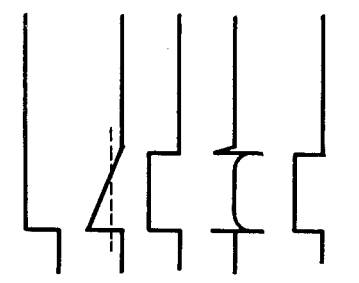
Fig. 40a
Fig. 40b
Fig. 40c
Fig. 40d
Fig. 40e
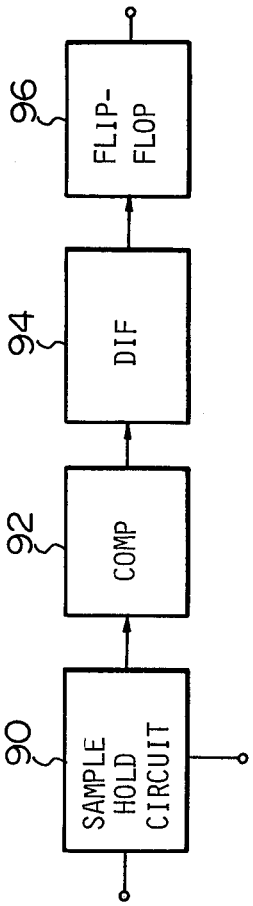
Fig. 39
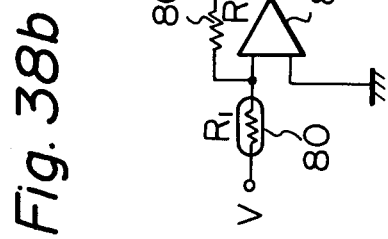
Fig. 38b
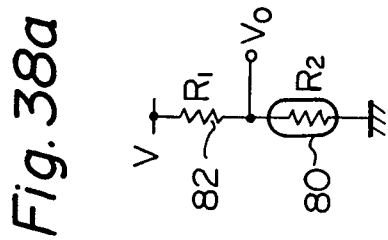
Fig. 38a ID LIQUID TEMPERATURE CONTROL APPARATUS COMPRISING INITIAL TEMPERATURE DEPENDENT HIGH POWER HEATER DRIVE

BACKGROUND OF THE INVENTION

The present invention relates to an apparatus for controlling the temperature of a liquid to a predetermined level and, more particularly, to such an apparatus of the type which efficiently and safely performs a temperature buildup control from a non-controlled temperature to a desired reference temperature, as distinguished from a usual or normal control which will follow the buildup control.

A liquid temperature control apparatus is known which uses a heater or like heating element to heat a liquid up to a given desired level. Such an apparatus usually comprises a sensor for sensing a liquid temperature and producing a voltage indicative of the sensed temperature, a heater for heating the liquid, a reference voltage source for generating a predetermined reference voltage, a differential amplifier for comparing the output voltage of the sensor with the reference voltage to produce their voltage differential, a heater drive for supplying a drive power to the heater in accordance with the voltage differential, and a timer for causing the heater drive to operate for a predetermined period of time. This type of prior art apparatus can prevent the liquid from being overheated or thermally overshot beyond the reference temperature, since the timer permits the heater drive to operate and, therefore, the liquid to be heated only for its operating period of time.

However, a drawback still results from the operating time period of the timer which is so selected as to promote an optimal buildup of the liquid temperature when the liquid temperature is at a usual or normal level. Even when the liquid temperature before controlled by the apparatus is substantially equal to or only slightly lower than a desired target or reference temperature, for example, the liquid is forcibly heated at least during the operating time period of the timer despite that such heating is hardly needed. This invites wasteful consumption of time and energy. Meanwhile, when the liquid temperature before a control is far lower than the reference temperature, that is, when the operating time period of the timer is short for the heater to sufficiently heat the liquid, a long period of time must be consumed until the reference temperature is reached by the liquid.

SUMMARY OF THE INVENTION

In accordance with one aspect of the present invention, the liquid temperature before a control is elevated to the reference temperature by varying the magnitude and/or application time period of the power for energizing the heater on the basis of a difference between a voltage corresponding to the actual temperature and a reference voltage corresponding to the reference temperature.

In accordance with another aspect of the present invention, the liquid temperature before a control is elevated to the reference temperature by varying the magnitude and/or application time period of the power for energizing the heater on the basis of another parameter which is the sum of a first voltage differential between a voltage corresponding to the actual temperature and a reference voltage corresponding to the reference temperature, and a second voltage differential between a voltage corresponding to a liquid temperature after the start of the control and the voltage corresponding to the reference temperature.

It is accordingly an object of the present invention to provide a liquid temperature control apparatus which can vary a temperature of a liquid quickly and efficiently to a desired reference level by controllably heating the liquid.

It is another object of the present invention to provide a generally improved liquid temperature control apparatus.

Other objects, together with the foregoing, are attained in the embodiments described in the following description and illustrated in the accompanying drawings.

BRIEF DESCRIPTION OF THE DRAWINGS

FIG. 1 is a block diagram showing the overall construction of a prior art liquid temperature control apparatus;

FIGS. 2a–2c show output waveforms of a power source, a timer and a heater drive which are included in the prior art apparatus of FIG. 1;

FIG. 3 shows curves demonstrating operations of the apparatus of FIG. 1 for different liquid temperatures;

FIG. 4 is a block diagram showing a liquid temperature control apparatus embodying the present invention;

FIGS. 5a–5c, 6a–6c and 7a–7c show output waveforms of a power source, a timer and a heater drive included in the apparatus of FIG. 4 each for different liquid temperatures;

FIGS. 11a–11c and 12a–12c show output waveforms of a power source, a timer and a heater current of the apparatus shown in FIG. 10 each for different liquid temperatures;

FIG. 13 is a block diagram showing a fifth embodiment of the present invention;

FIGS. 15a–15c and 16a–16c show output waveforms of a power source, a timer, a heater current and first and second power amplifiers included in the apparatus of FIG. 14;

FIGS. 18a–18d and 19a–19d show output waveforms of a power source, a timer, a power amplifier and a heater power of the apparatus shown in FIG. 17 each for different liquid temperatures;

FIGS. 24a–24d, 25a–25d and 26a–26d show output waveforms of a power source, an adder, a timer and a first heater drive of the apparatus shown in FIG. 23 each for different liquid temperatures;

FIGS. 29a-29d and 30a-30d show output waveforms of a power source, an adder, a timer and a first heater drive of the apparatus shown in FIG. 28 each for different liquid temperatures;

FIG. 33 is a block diagram of a sixteenth embodiment of the present invention;

FIGS. 34a-34e and 35a-35e show output waveforms of a power source, an adder, a timer, a power amplifier and a heater power of the apparatus indicated in FIG. 33 each for different liquid temperatures;

FIGS. 38a and 38b are circuit diagrams representing two examples of a temperature sensor;

FIG. 39 is a block diagram showing an example of a timer; and

FIGS. 40a-40e show output waveforms of various sections of the timer shown in FIG. 39.

DESCRIPTION OF THE PREFERRED EMBODIMENTS

Figure 8:
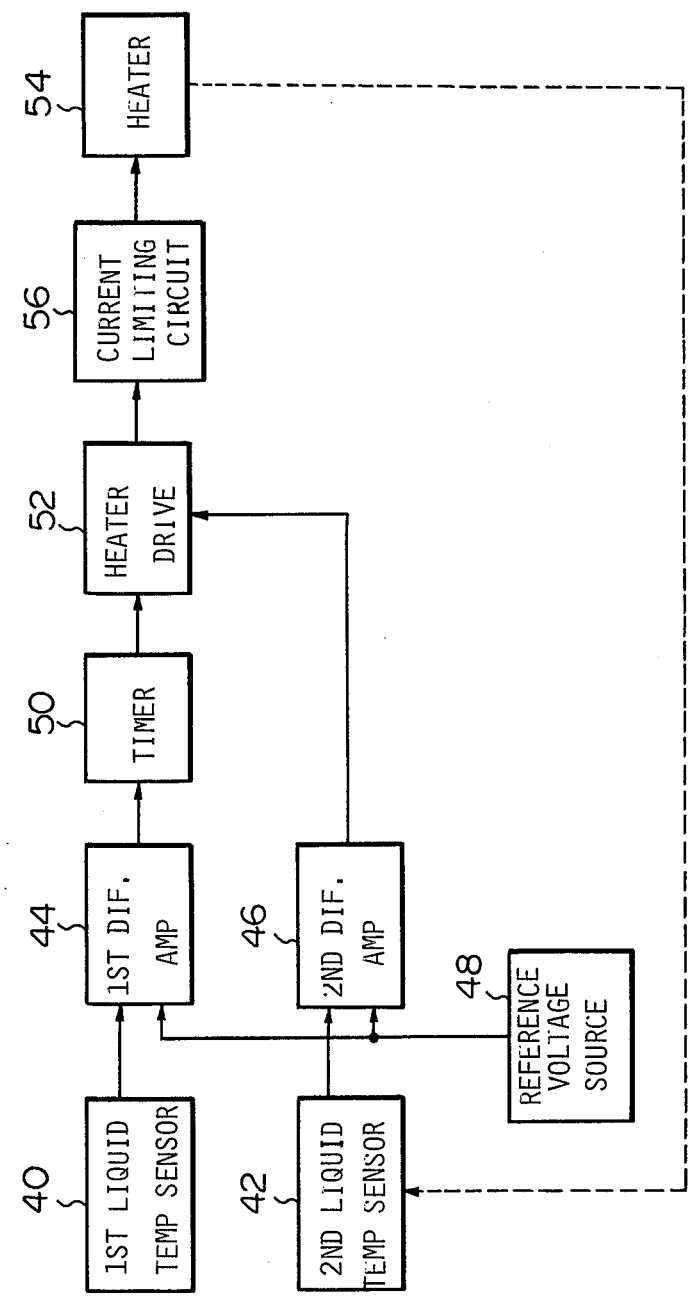
FIG. 8 is a block diagram showing a second embodiment of the present invention.

While the liquid temperature control apparatus of the present invention is susceptible of numerous physical embodiments, depending upon the environment and requirements of use, substantial numbers of the herein shown and described embodiments have been made, tested and used, and all have performed in an eminently satisfactory manner.

Referring to FIG. 1 of the drawings, a prior art liquid temperature control apparatus comprises a sensor 10 sensing the varying temperature of a liquid, a differential amplifier 12, a reference voltage source 14 generating a predetermined reference voltage, a timer 16 operable for a predetermined period of time, a heater drive 18 and a heater 20 adapted to heat the liquid. The sensor 10 and heater 20 are thermally coupled with each other through the liquid.

An operation of the liquid temperature controller having the above construction is indicated in FIGS. 2a-2c. When a power source of the controller is turned on as shown in FIG. 2a, the timer 16 is operated for a predetermined period of time as indicated in FIG. 2b so that a higher voltage is coupled from the heater drive 18 to the heater 20 for the operating time period of the timer 16 as seen in FIG. 2c. Such a control succeeds in preventing the liquid from thermally overshooting.

As previously stated, the operating time period of the timer 16 is usually so selected as to allow the temperature of the heater 20 to build up in an optimum manner when the liquid temperature is usual or normal. This will provide a liquid temperature buildup curve A shown in FIG. 3, in which the ordinate indicates the temperature T and the abscissa the time t. However, the ambient temperature may vary so much that the liquid temperature is raised to a level substantially equal to a target or reference temperature $T_D$. In this situation, the voltage application to the heater 20 while the timer 16 is operated is wasteful causing the liquid temperature to increase far beyond the reference temperature $T_D$ as represented by a buildup curve B in FIG. 3. A substantial period of time is necessary for such a high liquid temperature to be lowered by natural radiation. Thus, the operating time period of the timer 16 only creates a cause of wasteful time and power consumption if it is not zero. Meanwhile, when the ambient temperature is relatively low, the liquid temperature will build up as indicated by a buildup curve C in FIG. 3 taking a very long period of time, because of the previously mentioned inherent design of the timer 16.

The liquid temperature control apparatus of the present invention which is free from the problem discussed above will be described hereinafter in connection with its various embodiments illustrated in FIGS. 4-37.

Referring to FIG. 4, the liquid temperature control apparatus according to a first embodiment includes a first liquid temperature sensor 40 and a second liquid temperature sensor 42. Also included in the liquid temperature controller are a first differential amplifier 44, a second differential amplifier 46, a reference voltage source 48, a timer 50, a heater drive 52 and a heater 54. The first sensor 40 is responsive to a temperature of a liquid before a control or heating while the second sensor 42 is responsive to a temperature of the liquid after the start of a control. The temperature of the heater 54 is regarded as being substantially coincident with that of the liquid. The heater 54 and second sensor 42 are thermally coupled with each other. The design of the timer 50 is such that it produces a relatively short duration of pulse when its input voltage is relatively low, a relatively long duration of pulse when the same is relatively high, and no pulse when the same is zero or negative. It will be apparent to those skilled in this art that the timer 50 of such a design can be readily assembled using an integrator and a comparator. The reference voltage source 48 is employed to control the liquid temperature to a given level through the heater 54 under a usual mode of control.

When a power source (not shown) for the controller is turned on, the sensors 40 and 42 individually sense a temperature of the liquid and their output voltages are supplied to the differential amplifiers 44 and 46, respectively. The sensor output voltages are individually compared by the corresponding operational amplifiers with a reference voltage, which is coupled to the operational amplifiers from the reference voltage source 48 and represents a reference or target temperature. The output of the differential amplifier 44 is fed to the timer 50 while the output of the differential amplifier 46 is fed to the heater drive 52. If the sensed temperature is somewhat lower than the reference temperature, the output level of the sensor 40 is also relatively low causing the timer 50 to produce a pulse of a relatively short duration as indicated in FIG. 5b. This timer output pulse is coupled to the heater drive 52 whereby, for the specific duration of the pulse, a predetermined relatively high voltage is applied to from the heater drive 52 to the heater 54 as shown in FIG. 5c. After the pulse output of the timer 50 terminates, the heater drive 52 is allowed to supply the heater 52 with a controlled voltage in accordance with an output of the differential amplifier 46. In the meantime, if the liquid temperature sensed by the sensor 40 is far lower than the reference temperature, the associated differential amplifier 44 produces a far higher output voltage so that the timer 50 in turn produces a pulse of a duration shown in FIG. 6b which is longer than that of FIG. 5b. Then, as seen in FIG. 6c, the high voltage is coupled from the heater drive 52 to the heater 54 during a prolonged period of time. Furthermore, if the liquid temperature sensed by the sensor 40 is substantially the same as or higher than the reference temperature, no pulse appears from the timer 50 as shown in FIG. 7b and, accordingly, the output voltage of the heater drive 52 is dictated solely by an output voltage of the second sensor 42 to establish a usual mode of control. In this manner, the illustrated embodiment eliminates the drawback inherent in the prior art apparatus by supplying the heater 54 with a voltage having a variable or controllable duration in the buildup stage of the heater operation.

Referring to FIG. 8, there is shown a second embodiment of the present invention which is essentially similar to that of FIG. 4 except for the provision of a current limiting circuit 56 between the heater drive 52 and the heater 54. In FIG. 8, the functional blocks common to those of FIG. 4 are designated by the same reference numerals. The current limiting circuit 56 will prove effective to avoid damage to the heater 54 which would occur when the difference between the actual temperature of the liquid and the reference temperature was so large that the output voltage of the differential amplifier 46 became excessively high to increase the power supply from the heater drive 52 to the heater 54 beyond a designed allowable power of the heater.

Figure 9:
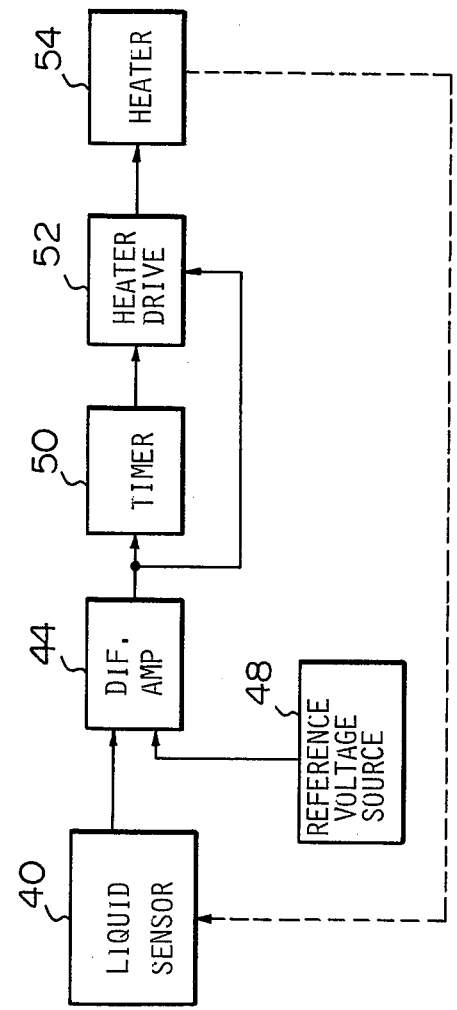
FIG. 9 is a block diagram showing a third embodiment of the present invention.

Referring to FIG. 9, a third embodiment of the present invention is illustrated which features a simplified circuit construction. The blocks of FIG. 9 common in function to those of FIG. 4 are denoted by the same reference numerals. As shown, use is made of a single temperature sensor 40 and a single differential amplifier 44 connected with the temperature sensor 40. The timer 50 is constructed such that it operates for a specific period of time which is determined by a voltage differential that corresponds to a difference between an actual liquid temperature and the reference temperature. After an operation of the timer 50, the controller performs a liquid temperature control in a usual mode. This arrangement unnecessitates the second temperature sensor 42 and second differential amplifier 46, thereby serving the function with a remarkably simplified circuitry.

As described so far, the first to third embodiments of the invention shown in FIGS. 4, 8 and 9 commonly employ a timer whose operating time period is controllably determined in accordance with the difference between a voltage corresponding to a liquid temperature which is sensed upon the turn-on of the power source and a reference voltage corresponding to a desired reference temperature. This permits a liquid subject to the control to be heated in a buildup stage for a time period which matches a temperature of the liquid before a control. Thus, not only the time period necessary for the buildup stage is cut down to preclude wasteful time consumption but power consumption is saved.

Figure 10:
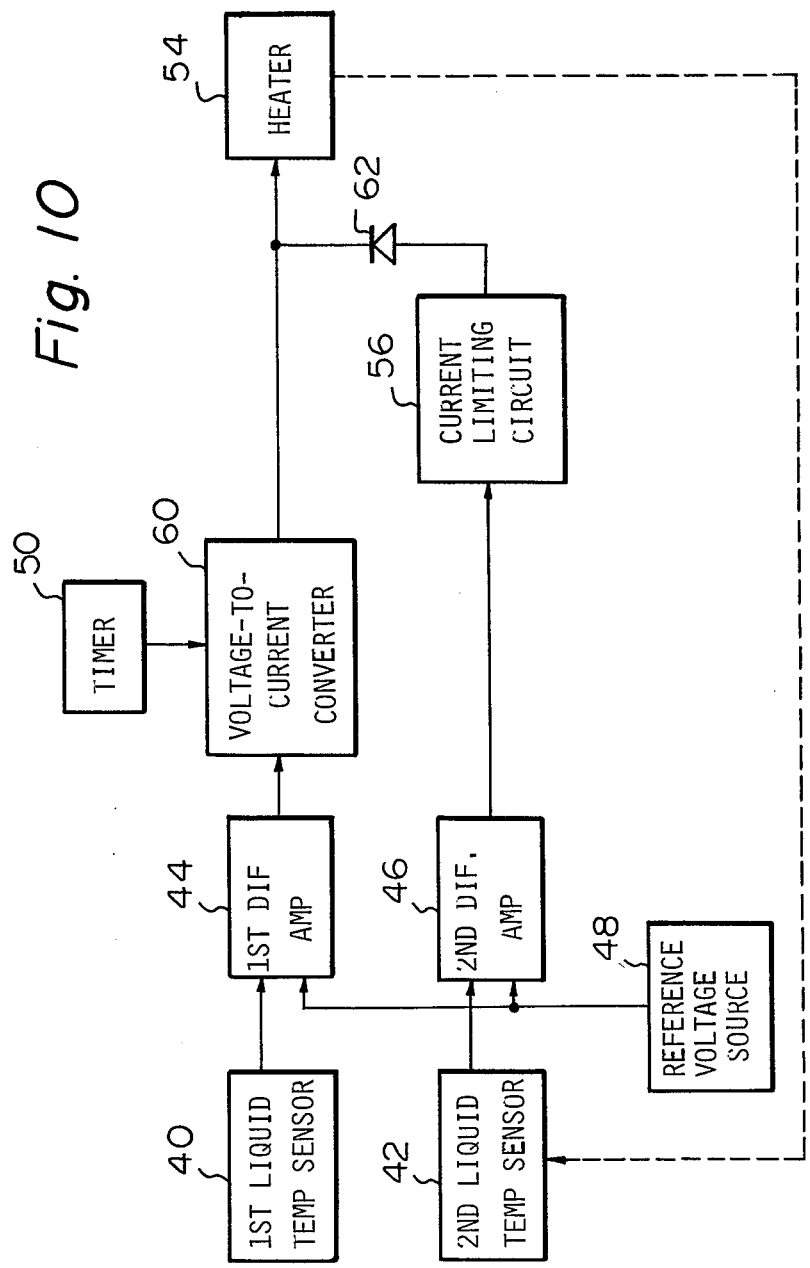
FIG. 10 is a block diagram of a fourth embodiment of the present invention.

Referring now to FIG. 10, a fourth embodiment of the invention is shown which is similar to the embodiment of FIG. 8 and, therefore, have like components denoted by the same reference numerals. In this embodiment, the heater drive 52 is constituted by a voltage-to-current conversion circuit 60. The voltage-to-current converter 60 produces a current which is proportional to a voltage output of the first differential amplifier 44, that is, the converter 60 output current is zero when the amplifier 44 output voltage is zero. The timer 50 supplies the voltage-to-current converter 60 with a pulse having a predetermined duration as soon as the power source is turned on. The output of the second operational amplifier 46 is coupled to the heater 54 via the current limiting circuit 56 and a reverse flow preventing diode 62.

When a power source is turned on as indicated in FIG. 11a, the output voltages of the first and second sensors 40 and 42 are compared by the corresponding differential amplifiers 44 and 46 with a reference voltage which is supplied from the reference voltage source 48 and represents a reference temperature. The output of the differential amplifier 44 is fed to the voltage-to-current converter 60. Upon the turn-on of the power source, the timer 50 is operated for a certain period of time as indicated in FIG. 11b to supply the voltage-to-current converter 60 with a pulse of a constant duration. When the actual liquid temperature is lower than the reference temperature, the differential amplifier 44 produces a relatively low voltage so that a relatively low buildup current is supplied to the heater 54 for the operating time period of the timer 50 as shown in FIG. 11c. The heater 54 is also supplied with a control current from the current limiting circuit 56 via the diode 62. When the liquid temperature is further lower than the reference temperature, the output voltage of the differential amplifier 44 is increased to in turn increase the output current of the voltage-to-current converter 60. This increased converter output current is superposed on the current from the current limiter 56 as indicated in FIG. 12c, whereby the heater 54 is energized by an increased current. Further, when the liquid temperature is substantially equal to or higher than the reference temperature, the output voltage of the differential amplifier 44 is zero and, accordingly, the output of the voltage-to-current converter 60 is zero despite an output of the timer 50. This permits only the control current to flow through the heater 54. With the wasteful current flow thus prevented, there can be eliminated thermal overshooting of the liquid.

In FIG. 10, the reverse current preventing diode 62 is indispensable for preventing the current limiter 56 from constituting a load of the voltage-to-current converter 60 in the buildup stage of the control. Should the diode 62 be absent, the current limiter 56 might be damaged or the buildup control might practically fail.

Referring to FIG. 13, a fifth embodiment of the invention is shown which is similar to the embodiment of FIG. 10 except that the voltage-to-current converter 60 is replaced by a power amplifier 70 and that the current limiting circuit 56 is interposed between the power amplifier 70 and the heater 54. In FIG. 13, the same blocks as those of FIG. 10 are denoted by the same reference numerals. With the illustrated arrangement, the output of the differential amplifier 44 is amplified by the power amplifier 70 to have a power capacity enough for a buildup, that is, such that only the current is increased with the voltage maintained the same. The output of the power amplifier 70 is coupled to the heater 54 for a period of time which is determined by the timer 50. When the voltage differential increases beyond the designed allowable power of the heater 54, it is used to limit the current flowing through a second current limiter 56a. This limits the power which is fed to the heater 54 during a buildup operation, promoting an effective buildup control without the fear of damage to the heater 54 or like accident.

Figure 14:
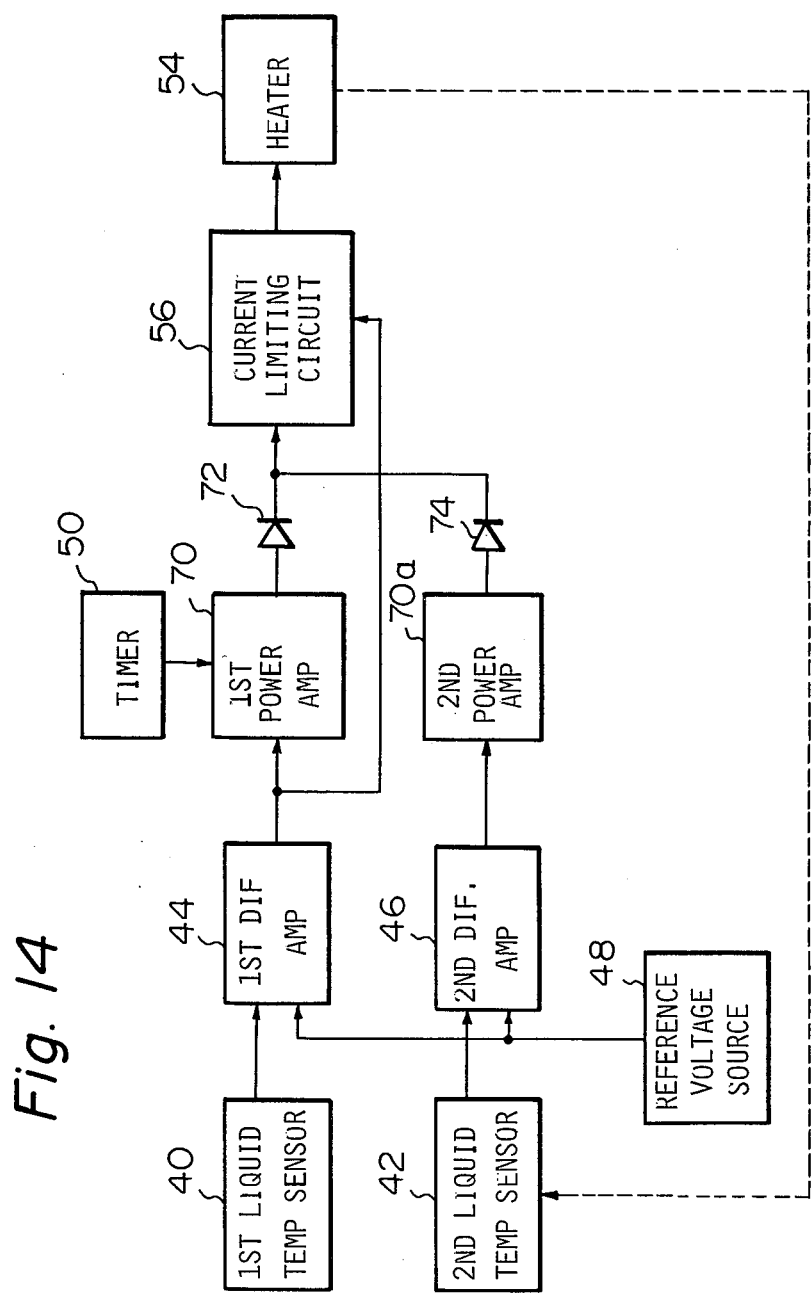
FIG. 14 is a block diagram showing a sixth embodiment of the present invention.

Referring to FIG. 14, a sixth embodiment of the invention is shown which essentially resembles the embodiment of FIG. 13 and, therefore, the same blocks as those of FIG. 13 are designated by the same reference numerals. A characteristic feature of the FIG. 14 arrangement is that a first reverse flow preventing diode 72 is interposed between a first power amplifier 70 and the current limiter 56, while the output terminal of the second operational amplifier 46 is connected to the current limiter 56 via a second power amplifier 70a and a second reverse flow preventing diode 74. When a power source is turned on as seen in FIG. 15a, the timer 54 is operated for a predetermined time period as indicated in FIG. 15b. For this time period, the first power amplifier 70 amplifies the output voltage of the differential amplifier 44 to a power necessary for a buildup operation and then supplies its output to the heater 54 via the diode 72 and current limiter 56. Meanwhile, the second power amplifier 70a amplifies the output of the differential amplifier 46 and supplies its output to the heater 54 through the diode 74 and current limiter 56. The current flowing through the heater 54 therefore increases as indicated in FIG. 15c.

In FIG. 14, the first diode 72 prevents a current from flowing into the second power amplifier during a buildup control whereas the second diode 74 prevents a current from flowing into the first power amplifier 70 during a usual control. The current limiter 56 functions to suppress the current to a predetermined value once the input voltage thereof reaches a certain level. For instance, when the first or second power amplifier 70 or 70a causes shortcircuiting therein as seen in FIG. 16c, the current limiter 56 will safeguard the heater 54 against overheating or burning which would otherwise result from an excessive current flowing into the heater 54 as shown in FIG. 12b. When an unusual current flows through the heater 54, the current flowing through the current limiter 56 may be made zero.

Figure 17:
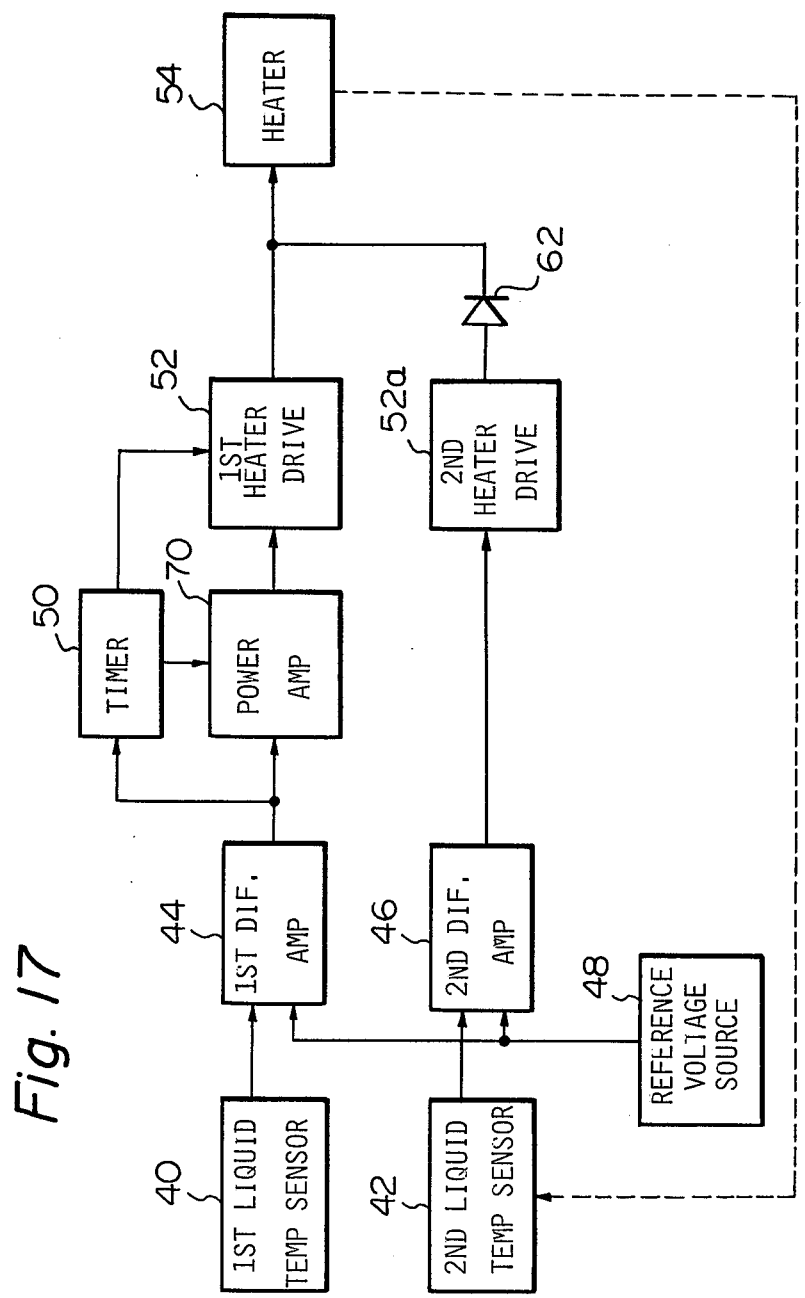
FIG. 17 is a block diagram showing a seventh embodiment of the present invention.

A seventh embodiment of the present invention is shown in FIG. 17, in which the same elements as those of the various foregoing embodiments are denoted by the same reference numerals. In FIG. 17, the output of the first differential amplifier 44 is coupled to both the power amplifier 70 and the timer 50. The timer 50 produces a pulse of a duration which is proportional to an output voltage of the first differential amplifier. The timer output is coupled to a first heater drive 52 together with the output of the power amplifier, the output of the heater drive 52 being supplied to the heater 54. The output of the second differential amplifier 46 is fed to the heater 54 via a second heater drive 52a and reverse flow preventing diode 62.

When the liquid temperature is slightly lower than a reference temperature, the output voltage of the first sensor 40 remains relatively low and so does the voltage which is supplied from the first differential amplifier 44 to the timer 50 and power amplifier 70 upon the turn-on of the power source. Therefore, as seen in FIGS. 18b and 18c, the operating time period of the timer 50 is relatively short, the output power of the power amplifier 70 is relatively small, and the power supplied to the heater 54 is relatively small as shown in FIG. 18b. When the liquid temperature is far lower than the reference level, the output of the first sensor 40 and therefore that of the differential amplifier 44 are relatively high causing the timer 50 to operate a longer period of time. This increases the output power of the power amplifier 70 and thereby the power supplied to the heater 54 as indicated in FIG. 19d.

It will be seen that the apparatus shown in FIG. 17 prevents thermal overshooting of the liquid since it controls the power during a buildup operation in accordance the relationship of the actual liquid temperature to the reference temperature. If the operating time period of the timer 50 and the output power of the power amplifier 70 are preselected to be compatible with the lowest liquid temperature before a control, the time period necessary for a buildup will become shorter as the liquid temperature is elevated, eliminating the drawback inherent in the prior art apparatus.

When the liquid temperature is equal to or higher than the reference temperature, the timer 50 of the apparatus of FIG. 17 has a zero operation time and the power amplifier 70 produces a zero output. Upon the turn-on of the power source, the output voltage of the second sensor 42 is compared by the second differential amplifier 46 with the reference voltage supplied from the reference voltage source 48. The second heater drive 52b supplies power to the heater 54 via the diode 62. In this way, even after the actual liquid temperature approaches the reference temperature to make the outputs of the timer 50 and power amplifier 70 zero, the liquid temperature is controlled in a usual mode. The function of the diode 62 is to prevent a current from flowing from the first heater drive 52 into the second heater drive 52a when the output voltage of the latter is lower than that of the former.

Figure 20:
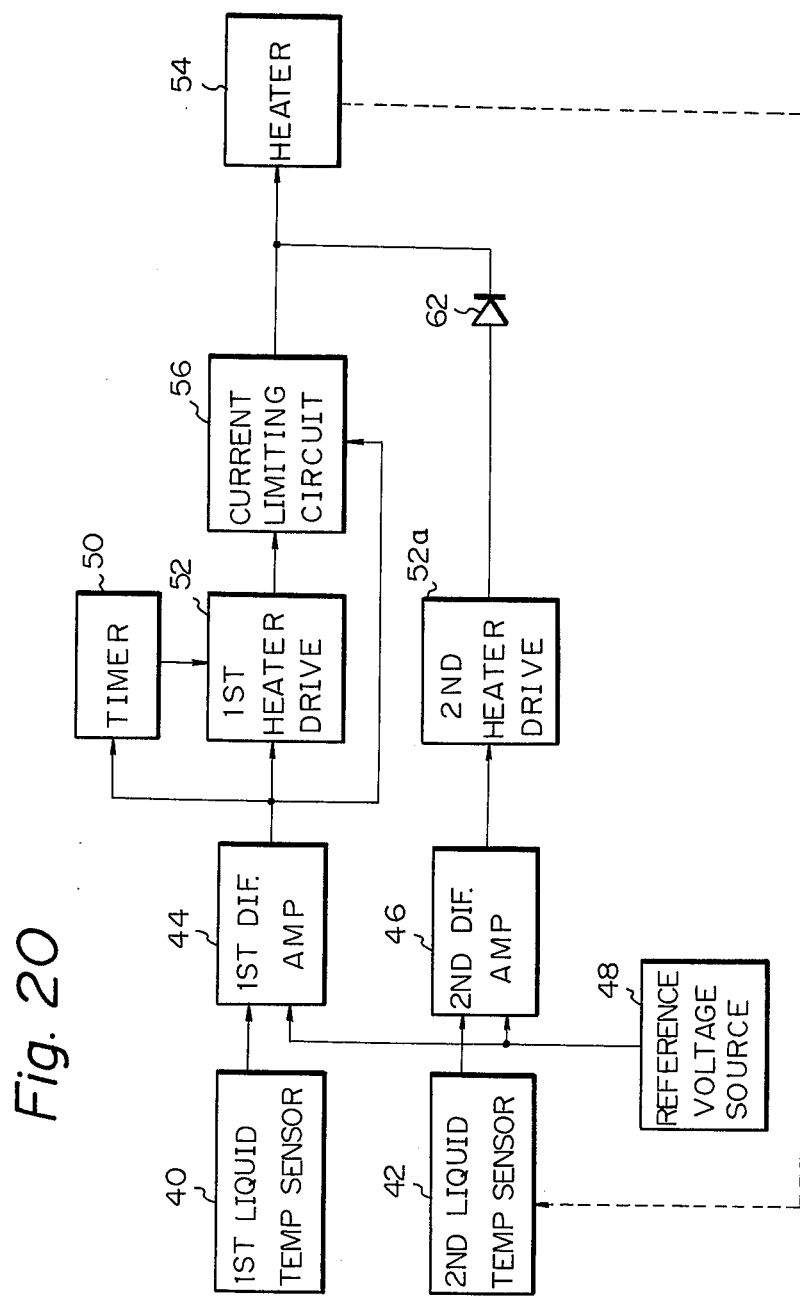
FIGS. 20–22 are block diagrams showing eighth to tenth embodiments of the present invention, respectively.

Referring to FIG. 20, an eighth embodiment of the invention is shown which is essentially similar to FIG. 17 and, therefore, the same blocks thereof will be denoted by the same reference numerals. The liquid temperature control apparatus in FIG. 20 has the current limiter 56 connected to the output terminal of the first heater drive 52, supplies an output of the first differential amplifier 44 to the timer 50, first heater drive 52 and current limiter 56, and omits the power amplifier 70. As in the preceding embodiments, the timer 50 is operated for a time period determined by an output voltage of the first differential amplifier 44 which indicates a difference between the liquid temperature and the reference temperature. Also, the heater is supplied with power from the first heater drive 52 in response to the output of the differential amplifier 44. Where the actual liquid temperature is far lower than the reference temperature, the heater 54 has to be supplied with a large current for a substantial period of time to heat the liquid to the reference temperature. This tends to burn the heater 54 and, in the worst case, causes a fire. To overcome this problem, the current to be supplied to the heater 54 is suppressed to an allowable range by selecting the operating voltage of the current limiter 56 such that the difference between the sensor 40 output voltage and the reference voltage slightly exceeds the allowable limit of the heater 54. This ensures safety operations though somewhat sacrificing the buildup time period.

Figure 21:
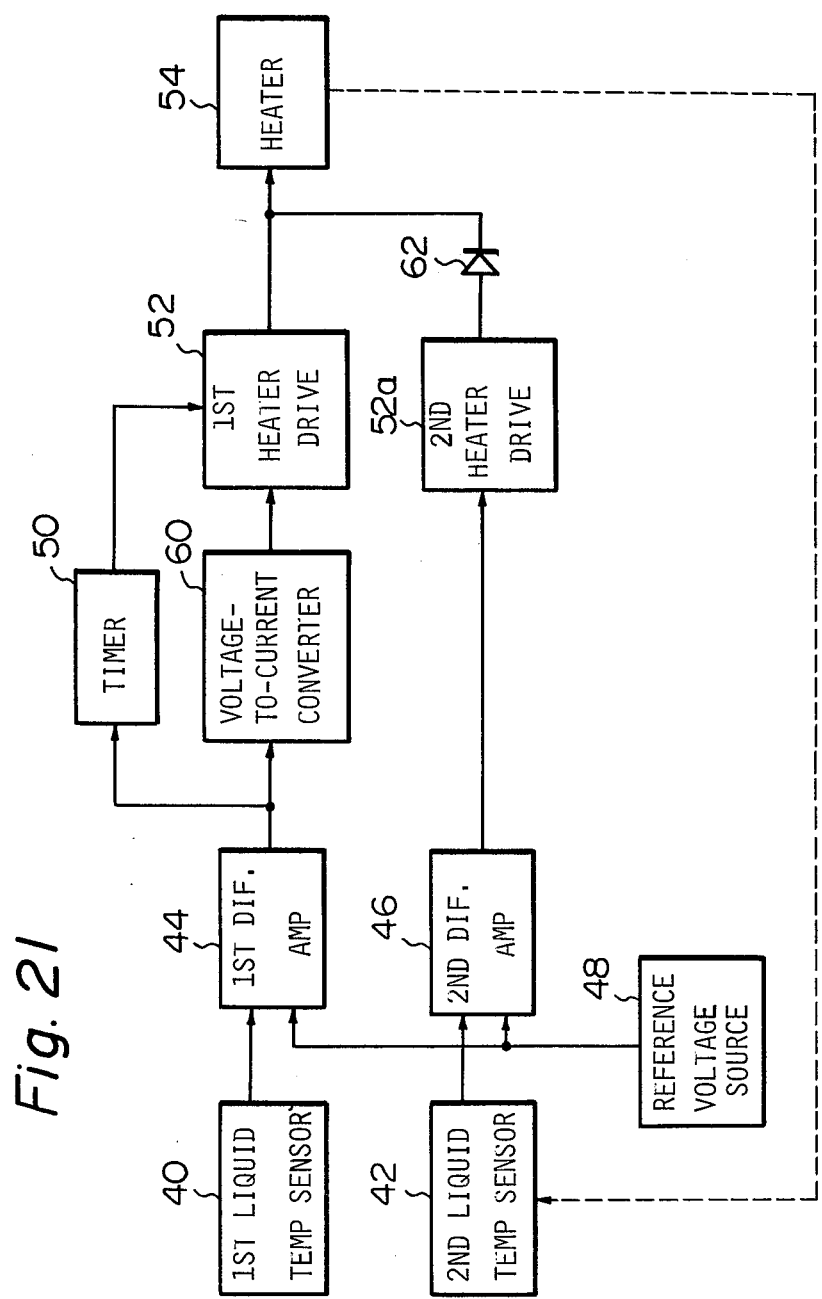

FIG. 21 shows a ninth embodiment of the present invention which is also similar to FIG. 17 and, therefore, the same blocks thereof will be denoted by the same reference numerals. An essential feature of this embodiment is that the voltage-to-current converter 60 is connected between the first differential amplifier 44 and the first heater drive 52. The liquid temperature control apparatus of FIG. 21 will be operated substantially in the same way as that of FIG. 17 and, thus, its operation will not be described herein. It will be apparent that the current limiter 56 can be connected to the input terminal of the heater 54.

Figure 22:
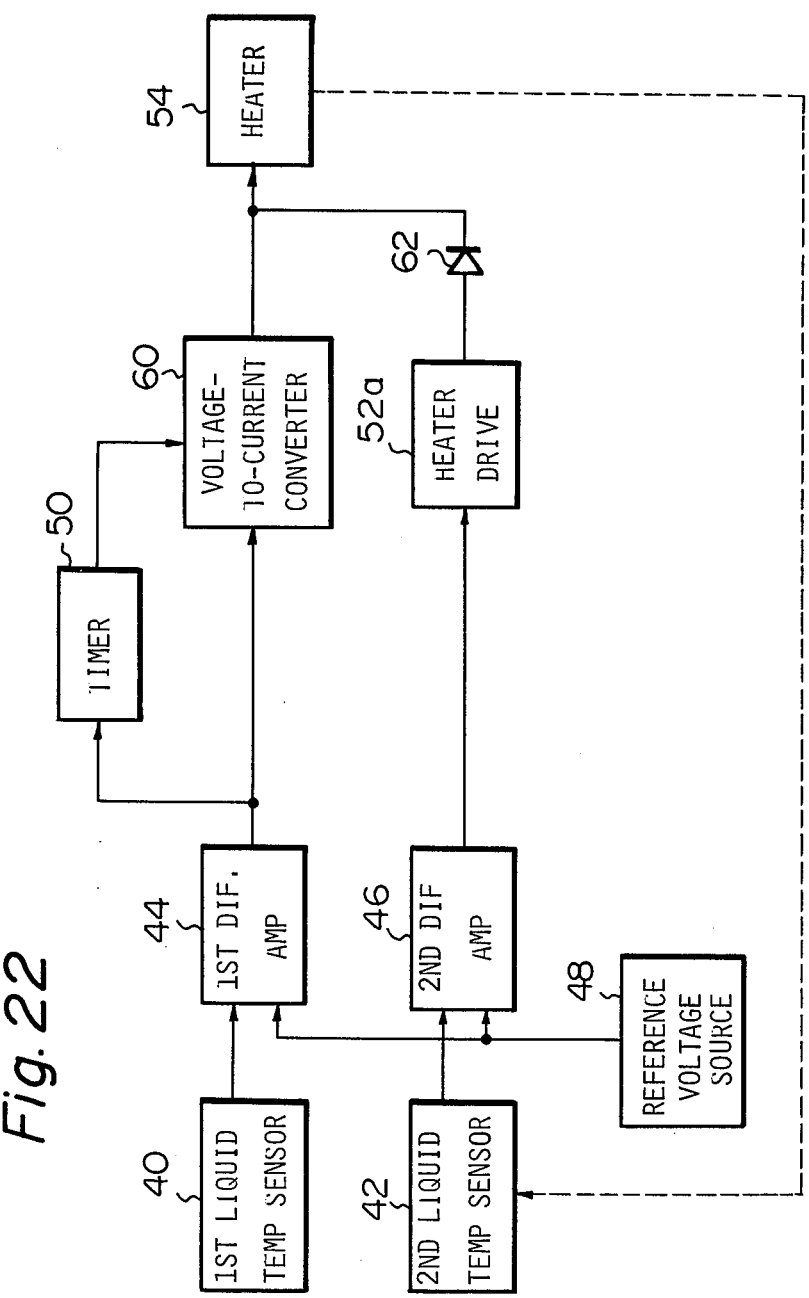

FIG. 22 shows a tenth embodiment of the invention which is similar to the embodiment of FIG. 21, the same blocks being denoted by the same reference numerals. A characteristic feature of this embodiment resides in that the output of the voltage-to-current converter 60 is controlled by the outputs of the first differential amplifier 44 and timer 50. The operation of such an apparatus will not be described herein since it is substantially the same as that of the FIG. 17.

Each of the apparatuses shown in FIGS. 17, 20, 21 and 22 is constructed to energize the heater 54 with a power and for a time period which are determined by a voltage differential between the first temperature sensor 40 and the reference voltage source 48, when the power source is turned on for a buildup operation. It will thus be seen that the apparatus prevents the liquid from thermally overshooting at the buildup stage. Also, the liquid temperature is prevented from overshooting beyond the reference level when the voltage differential between the first sensor and the reference voltage source is zero, since under this condition the buildup voltage applied is zero to establish a usual mode of control.

Figure 23:
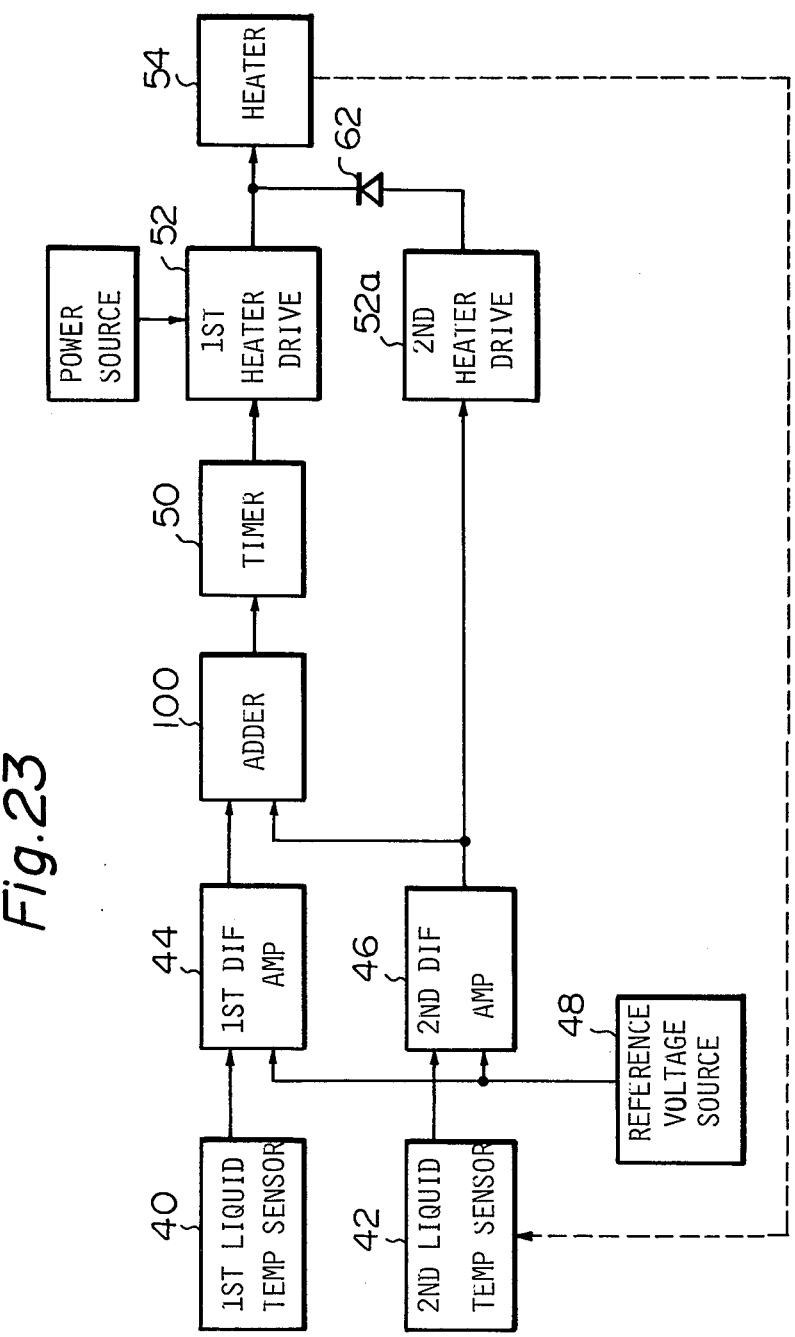
FIG. 23 is a block diagram showing an eleventh embodiment of the present invention.

Referring to FIG. 23, there is shown an eleventh embodiment of the present invention, in which the same blocks as those of the preceding embodiments are denoted by the same reference numerals. A major difference of this embodiment from those described hereinabove lies in that an adder circuit 100 is interposed between the first and second differential amplifiers 44 and 46 and the timer 50. The adder 100 sums up the outputs of the differential amplifiers 44 and 46 and supplies its summation voltage to the timer 50.

In operation, the first and second temperature sensors 40 and 42 individually sense liquid temperatures to couple their output voltages to the first and second differential amplifiers 44 and 46, respectively. Each differential amplifier 44 or 46 compares the input voltage with a reference voltage supplied thereto from the reference voltage source 48. The outputs of the differential amplifiers 44 and 46 are supplied to the adder 100. The output of the differential amplifier 46 is also supplied to the second heater drive 52a. The output of the second heater drive 52a is fed through the diode 62 to the heater 54 to cause a usual mode of control.

The timer 50 in FIG. 23 is controlled by an output of the adder 100. When the liquid temperature is slightly lower than the reference temperature, the output voltage of the adder 100 is relatively low as shown in FIG. 24b when the power source is turned on as seen in FIG. 24a. Under this condition, the output pulse of the timer 50 has a relatively short duration as indicated in FIG. 24c so that the heater drive 52 is caused to produce a buildup power which is relatively small as indicated in FIG. 24d. When the liquid temperature is far lower than the reference temperature, the output voltage of the adder 100 appearing at the turn-on of the power source is relatively high as shown in FIG. 25b. Then, the timer 50 produces a pulse whose duration is relatively long as shown in FIG. 25c, whereby the first heater drive 52 is caused to supply the heater 54 with a relatively large buildup power. Further, when the liquid temperature is substantially equal to or higher than the reference temperature, the output of the adder 100 appearing at the turn-on of the power source is zero as indicated in FIG. 26b and, accordingly, the timer 50 output is zero allowing no output pulse to appear from the timer 54 as shown in FIGS. 26c and 26d. The heater 54 in this instance is energized by an output of the second heater drive 52a for a usual mode of control.

It will be seen that the liquid temperature controller shown in FIG. 23 is operable in the same way even if a single temperature sensor is employed, in contrast to the illustrated two sensors. However, should the single temperature sensor be located remote from the heater 54, the liquid would thermally overshoot when the power source was turned on immediately after being turned off to complete a heating cycle. With this in view, whereas the first sensor 40 is positioned remote from the heater 54, the second sensor 42 is located in the vicinity of the heater 54. The diode 62 connected between the first and second heater drives 52 and 52a serves to prevent a current from flowing from the first 52 to the second 52a when the output voltage of the former is very high and that of the latter is low.

Figure 27:
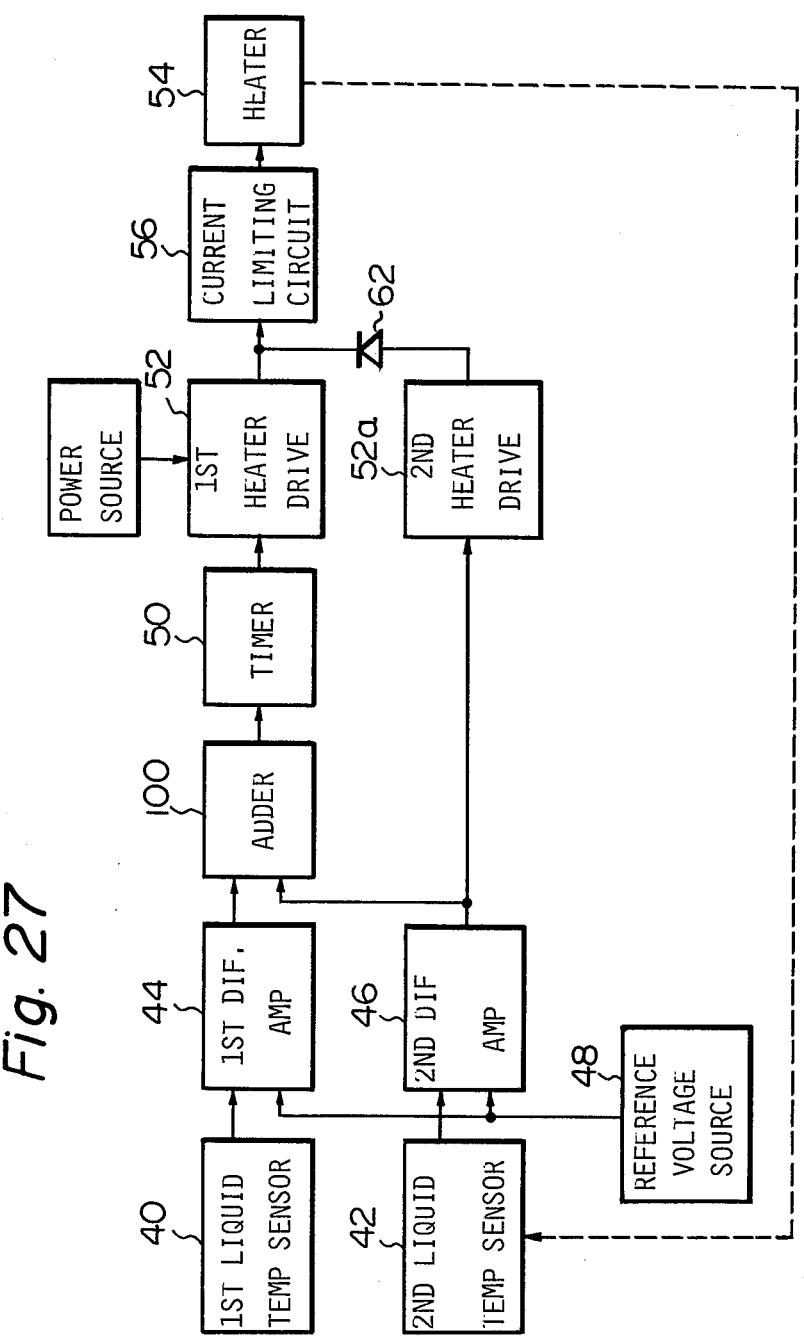
FIG. 27 is a block diagram showing a twelfth embodiment of the present invention.

FIG. 27 shows a twelfth embodiment of the invention which is similar to the embodiment of FIG. 23 and, therefore, the same component elements are denoted by the same reference numerals. In this embodiment, the current limiting circuit 56 is connected between the first and second heater drives 52 and 52a. As will be apparent from the discussion of the foregoing embodiments, the current limiter 56 functions to safeguard the heater 54 against damage when the difference between the liquid temperature and the target temperature is so large that the first and second heater drives 52 and 52a produce excessive outputs to increase the heater power beyond the designed value.

As stated hereinabove, the embodiments shown in FIGS. 23 and 27 are commonly characterized in that the timer is operated by a summation output of the adder which sums up the voltage differentials between the first and second temperature sensors and the reference voltage source. Determining the buildup heating time period based on a liquid temperature, such an arrangement saves the time period necessary for a buildup operation and thereby the power consumption. Another advantage is that an error can be eliminated when different liquid temperatures are sensed individually by the first and second sensors.

Figure 28:
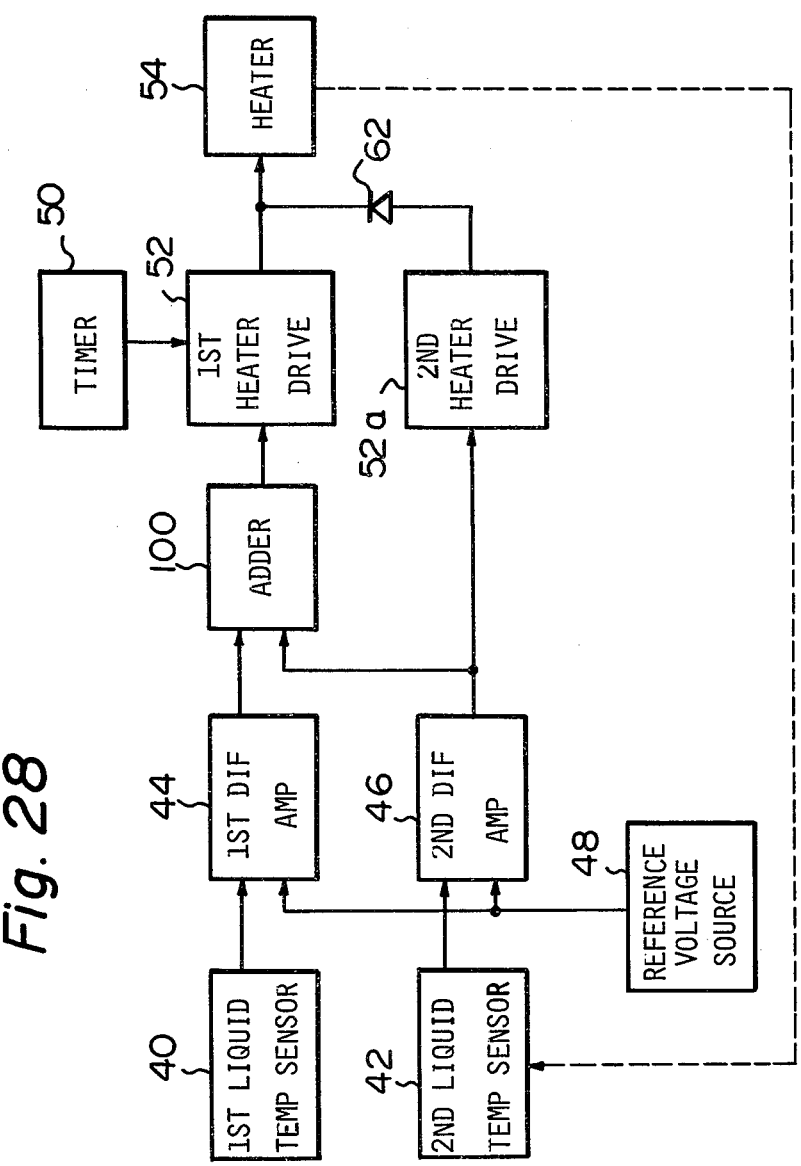
FIG. 28 is a block diagram showing a thirteenth embodiment of the present invention.

Reference will now be made to FIG. 28 for describing a thirteenth embodiment of the invention. In FIG. 28, the same blocks as those shown in FIGS. 23 and 27 are denoted by the same reference numerals. The temperature sensors 40 and 42 individually sensing liquid temperatures supply their output voltages to their associated differential amplifiers 44 and 46 to be compared thereby with a reference voltage, which is supplied from the reference voltage source 48. The outputs of the differential amplifiers 44 and 46 are coupled to the adder 100 whose output is in turn coupled to the first heater drive 52. The output of the differential amplifier 46 is also coupled to the second heater drive 52a the output of which is fed via the diode 62 to the heater 54 for a normal mode of control.

The output of the adder 100 in FIG. 28 is adapted to control the output of the first heater drive 52. When the liquid temperature is somewhat lower than the reference temperature, the adder 100 produces a relatively low output voltage as seen in FIG. 29b when the power source is turned on as indicated in FIG. 29a. Then, the first heater drive 52 generates a relatively low output as shown in FIG. 29d while the timer 50 is operated for a given period of time which is shown in FIG. 29c, the buildup operation needing a relatively small power. When the liquid temperature is far lower than the reference temperature, the adder 100 produces a relatively high output voltage as shown in FIG. 30b when the power source is turned on as shown in FIG. 30a. Under this condition, the output of the heater drive 52 during a given time period of operation of the timer 50 is relatively large as indicated in FIG. 30d to supply a relatively large power to the heater. When the liquid temperature is substantially the same as or higher than the reference temperature, the output of the adder 100 appearing at the turn-on of the power source is zero and so is the output of the first heater drive 52, maintaining the buildup power supply to the heater 54 zero.

Figure 31:
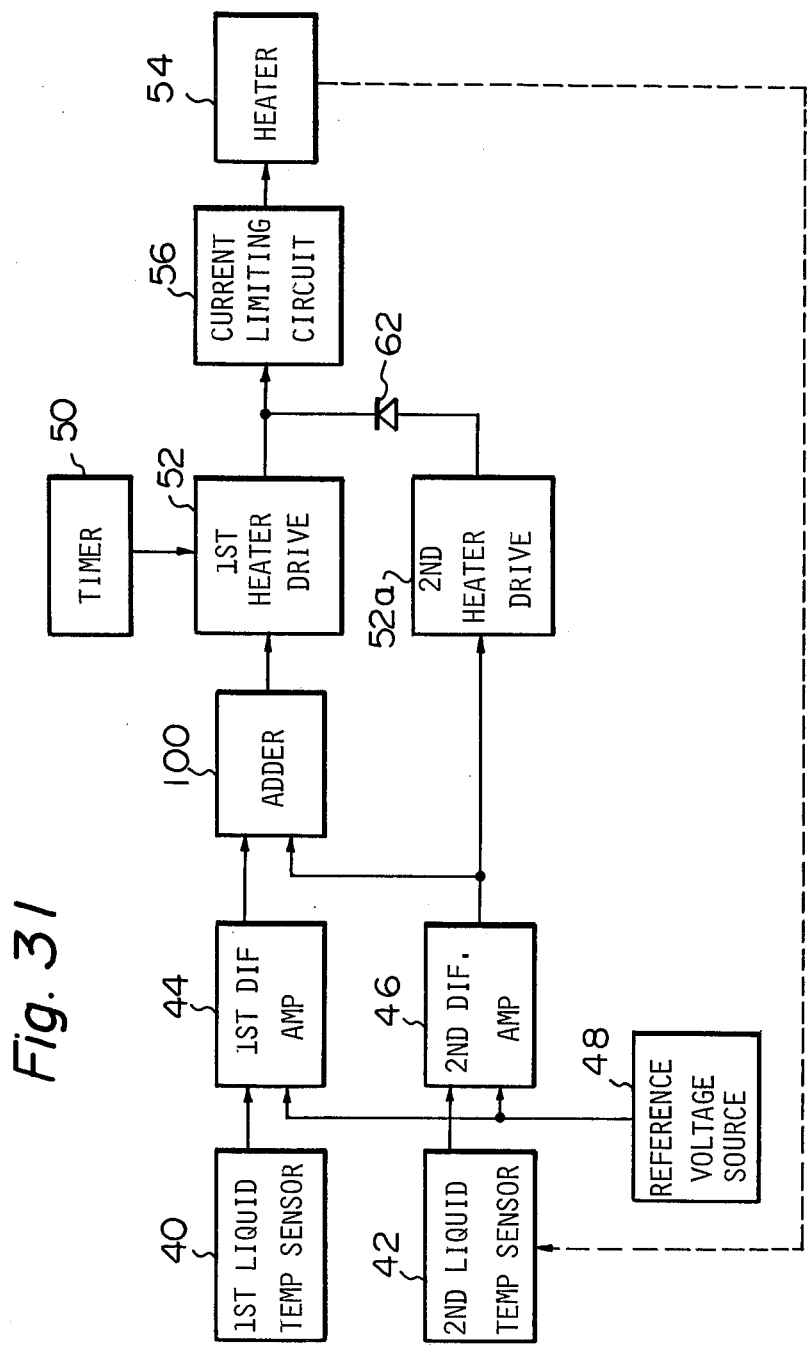
FIGS. 31 and 32 are block diagrams illustrating fourteenth and fifteenth embodiments of the present invention, respectively.

A fourteenth embodiment of the present invention is depicted in FIG. 31, in which the same blocks as those of FIG. 28 are designated by the same reference numerals. The apparatus in FIG. 31 has the current limiting circuit 56 connected to the input terminal of the heater 54. With this arrangement, an excessive current is prevented from flowing through the heater 54 to invite a fire or damage to the heater 54 when short-circuiting occurs in the heater drive 52 and/or 52a.

Figure 32:
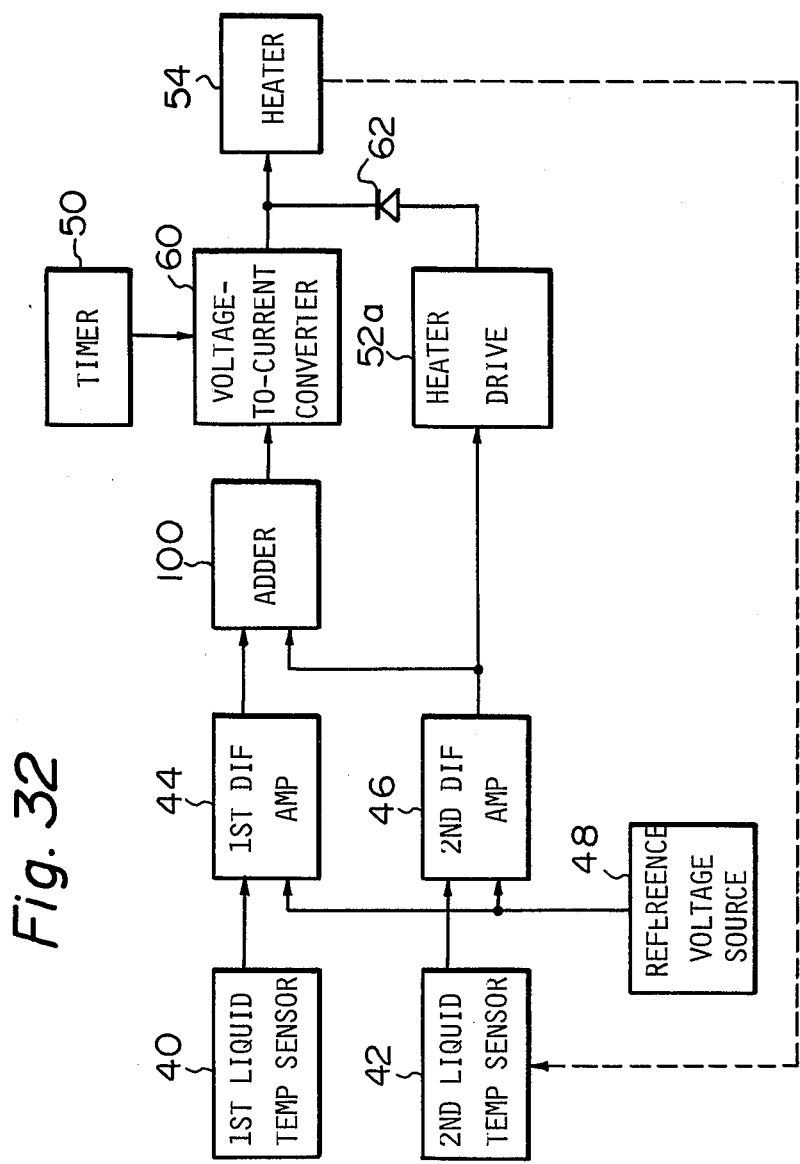

A fifteenth embodiment of the invention is illustrated in FIG. 32, in which the same blocks as those of FIG. 28 are also denoted by the same reference numerals. This embodiment is essentially the same in construction and operation as the embodiment of FIG. 28 except that the first heater drive 52 is replaced by the voltage-to-current converter 60 and the operation is modified a little accordingly. It will be apparent that the current limiter 56 employed in the embodiment of FIG. 31 can be added to the circuitry of FIG. 32.

Referring to FIG. 33, there is shown a sixteenth embodiment of the invention which has the component elements common to those of the foregoing embodiments denoted by the same reference numerals. Different from the foregoing embodiments, the embodiment in FIG. 33 includes the power amplifier 70 which is disposed between the adder 100 and the first heater drive 52. The outputs of the temperature sensors 40 and 42 indicative of liquid temperatures are coupled to their associated differential amplifiers 44 and 46 to be compared thereby with a reference voltage supplied from the reference voltage source 48. The voltage differentials are fed from the individual differential amplifiers 44 and 46 to the adder 100. The summation output of the adder 100 is delivered to the power amplifier 70 so that a power corresponding to the adder output is coupled to the first heater drive 52. The output of the adder 100 is also fed to the timer 50 the output of which has a duration corresponding to the adder output. For the operating time period of the timer 50, the output power of the power amplifier 70 is supplied to the heater 54 via the first heater drive 52. The output voltage of the second differential amplifier 46 is coupled to the second heater drive 52a the output of which is fed via the diode 62 to the heater 54 for a usual mode of control.

The output of the adder 100 in FIG. 33 is used to control the output power of the power amplifier 70 and the operation time of the timer 50. When the liquid temperature is slightly lower than the reference temperature, the adder 100 produces a relatively low output voltage as seen in FIG. 34b when the power source is turned on as seen in FIG. 34a. Then, the output pulse of the timer 50 has a relatively short duration as shown in FIG. 34c while the power amplifier 70 produces a relatively small power, the heater 54 thus being supplied with a relatively small power as shown in FIG. 34e. When the liquid temperature is far lower than the reference temperature, the adder 100 produces a relatively high voltage as shown in FIG. 35b upon the turn-on of the power source which is indicated in FIG. 35a. In this condition, the output pulse of the timer 50 has a relatively long duration as shown in FIG. 35c while the power amplifier 70 produces a relatively large power as indicated in FIG. 35d, the heater 54 being supplied with a large power for its buildup operation as shown in FIG. 35e. Further, when the liquid temperature is equal to or higher than the reference temperature, the output of the adder 100 appearing at the turn-on of the power source is zero maintaining zero the power necessary for the buildup.

Figure 36:
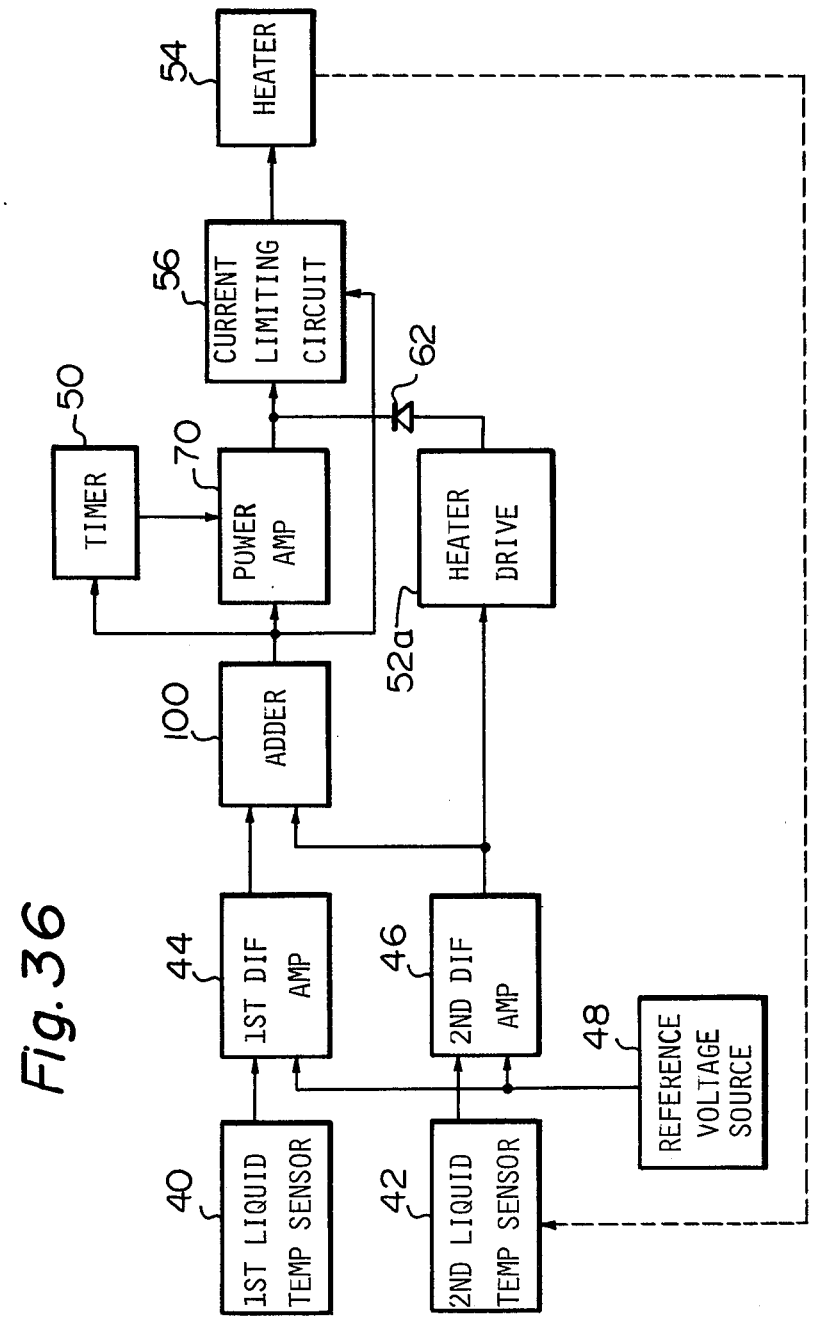
FIGS. 36 and 37 are block diagrams of the seventeenth and eighteenth embodiments of the present invention, respectively.

FIG. 36 shows a seventeenth embodiment of the invention in which the same blocks as those of FIG. 33 are denoted by the same reference numerals. In this embodiment, the output of the power amplifier 70 is controlled by the output of the timer 50. The current limiter 56 similar to that of FIG. 33 is connected with the input terminal of the heater 54 to limit a current to flow into the heater 54 when the output voltage of the adder 100 exceeds a predetermined level.

Figure 37:
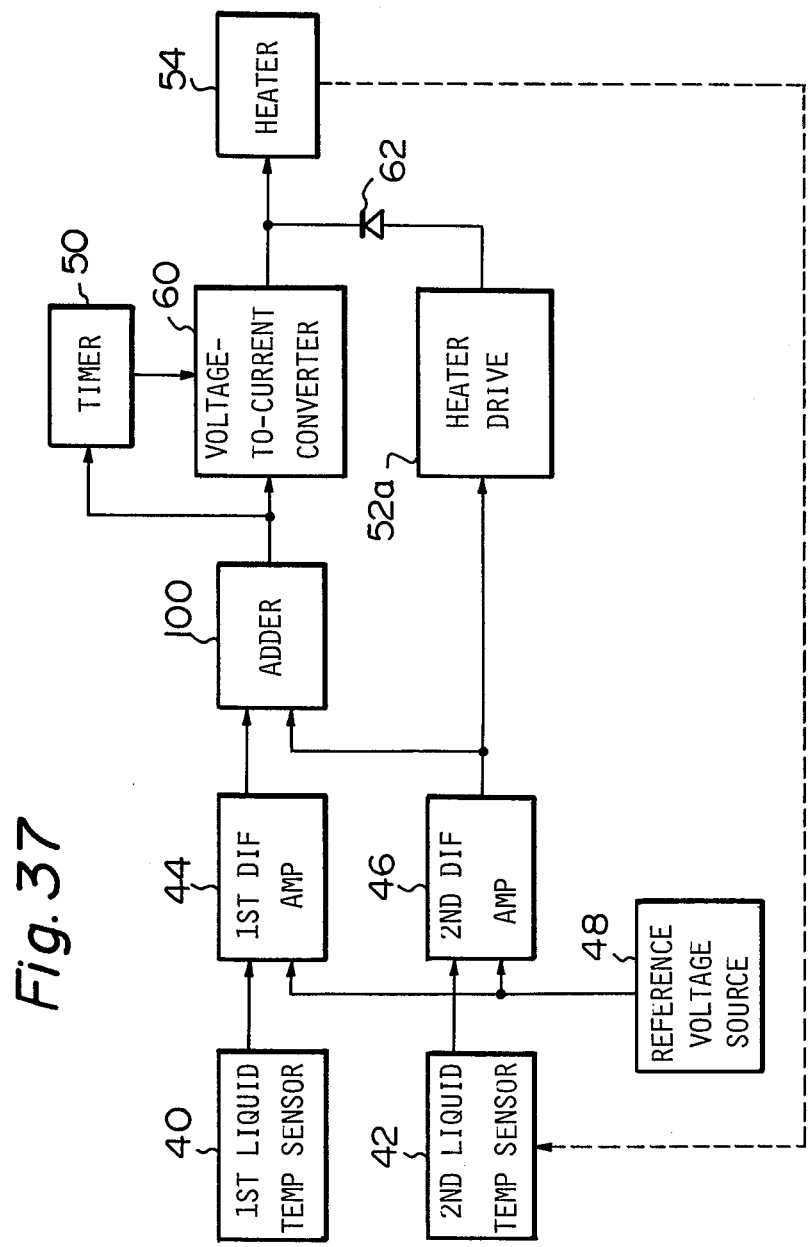

In FIG. 37, an eighteenth embodiment of the invention is illustrated which has the same blocks as those of FIG. 33 also denoted by the same reference numerals. The embodiment of FIG. 37 differs from that of FIG. 33 in that the power amplifier 70 is replaced by the voltage-to-current converter 60. Thus, the output of the adder 100 is converted by the converter 60 into a corresponding current. The operation of this apparatus is therefore exactly the same as that of the apparatus of FIG. 33 and will not be described any further. It will be needless to mention that the current limiter 56 employed in the FIG. 36 embodiment may be connected with the output terminal of the voltage-to-current converter 60 of the FIG. 37 embodiment.

Finally, reference will be made to FIGS. 38a and 38b, 39 and 49a–40e for describing some examples of the temperature sensors and timer. In FIGS. 38a and 38b, the temperature sensors 40 and 42 comprise heat sensitive elements 80 whose resistance varies with the ambient temperature, e.g. thermistors or temperature sensitive resistors. The heat sensitive element 80 in FIG. 38a is connected in series with a resistor 82. Supposing that the input voltage is V, the resistance of the resistor 82 is $R_1$ and the resistance of the heat sensitive element 80 is $R_2$, the voltage $V_0$ appearing at the junction between the heat sensitive element 80 and the resistor 82 is expressed as:

$$V_0 = (R_2/R_1)V$$

This equation teaches that the voltage $V_0$ at the junction varies when the resistance of the heat sensitive element 80 is varied in accordance with the temperature, that is, a change in temperature can be picked up as a change in voltage. In FIG. 38b, the heat sensitive element 80 is connected with the inverting input terminal of an operational amplifier 84 whose non-inverting input terminal is grounded. A resistor 86 is connected between the inverting and non-inverting inputs of the operational amplifier 84. When the input voltage V is held at a constant level, the current input to the operational amplifier 84 will vary in accordance with a change in the resistance of the heat sensitive element 80. This current is converted into a voltage $V_0$ which is expressed as:

$$V_0 = (R_3/R_1)V$$

where $R_3$ indicates the resistance of the resistor 86. Supposing a relation $R_1 < R_3$, then the voltage $V_0$ is delivered after being amplified.

In FIGS. 38 and 40a–40e, the timer 54 comprises a circuit which is designed to produce a pulse having a duration proportional to an input voltage. As shown in FIG. 39, the timer 54 is made up of a sample hold circuit 90, a comparator 92, a differentiator 94 and a flip-flop 96. When a power is supplied to the timer 54 as shown in FIG. 40a, the sample hold circuit 90, comparator 92 and differentiator 94 produce outputs in sequence as indicated in FIGS. 40b–40d, respectively. Then, the flip-flop 96 produces a pulse output whose duration corresponds to the input voltage. As will be noted, the holding characteristic of the sample hold circuit 90 is controlled to a desired value.

Various modifications will become possible for those skilled in the art after receiving the teachings of the present disclosure without departing from the scope thereof.

What is claimed is:

1. A liquid temperature control apparatus for controlling the temperature of a liquid to a predetermined level comprising:
    heater means for heating the liquid;
    reference means for producing a reference output signal indicative of the predetermined level;
    first sensor means for sensing an initial temperature of the liquid upon energization of the apparatus to produce a first sensing output signal indicative of the initial temperature level;
    first differential amplifier means for comparing the first sensing output signal with the reference output signal to produce a first differential output signal representing the difference between the predetermined level and the initial temperature level;
    second sensor means for sensing a controlled temperature of the liquid which is being heated by the heater means to produce a second sensing output signal indicative of the varying controlled temperature level;
    second differential amplifier means for comparing the second sensing output signal with the reference output signal to produce a second differential output signal representing the difference between the predetermined level and the varying controled temperature level;
    timer means for producing a pulse output signal upon energization of the apparatus;
    heater drive circuit means for initially applying a high drive power to the heater means in response to the pulse output signal from the timer means for a pulse duration of the timer means and for subsequently producing a heater drive power output signal in response to the second differential output signal to apply a variable heater drive power to the heater means, the high drive power being higher than the variable heater drive power; and
    control means for controlling the timer means and the heater drive circuit means such that at least one of the pulse duration of the timer means and the high drive power of the heater drive circuit means is varied depending on the first differential output signal.

2. An apparatus as claimed in claim 1, in which the first and second sensor means comprise a single sensor, and the first and second differential amplifier means comprise a single differential amplifier.

3. An apparatus as claimed in claim 1, in which said first differential output comprises a voltage output, said heater drive circuit means comprising a voltage-to-current converter for producing a current proportional to the voltage output.

4. An apparatus as claimed in claim 3, in which said heater drive circuit means further comprises a current limiter connected between the heater means and the heater drive circuit means.

5. An apparatus as claimed in claim 3, in which said heater drive circuit means further comprises a series connection of a current limiter and a reverse current flow preventing means, the series connection being connected between the second differential amplifier means and the heater means.

6. An apparatus as claimed in claim 1, in which said heater drive circuit means comprises a first series connection of a power amplifier and a first current limiter and a second series connection of a second current limiter and a reverse current flow preventing means, the first series connection being connected between the first differential amplifier means and the heater means, the second series connection being connected between the second differential amplifier means and the heater means.

7. An apparatus as claimed in claim 1, in which said heater drive circuit means comprises a first series connection of a first power amplifier, a first reverse current flow preventing means and a current limiter and a second series connection of a second power amplifier and a second reverse current flow preventing means, the first series connection being connected between the first differential amplifier means and the heater means, the second series connection being connected between the second differential amplifier means and the current limiter.

8. An apparatus as claimed in claim 1, in which said heater drive circuit means comprises a first series connection of a power amplifier and a first heater driver and a second series connection of a second heater driver and a reverse current flow preventing means, the first series connection being connected between the first differential amplifier means and the heater means, the second series connection being connected between the second differential amplifier means and the heater means.

9. An apparatus as claimed in claim 1, in which said heater drive circuit means comprises a first heater driver connected between the first differential amplifier means and the heater means and a series connection of a second heater driver and a reverse current flow preventing means, the series connection being connected between the second differential amplifier means and the heater means.

10. An apparatus as claimed in claim 9, in which said heater drive circuit means further comprises a current limiter connected between the first heater driver and the heater means.

11. An apparatus as claimed in claim 9, in which said heater drive circuit means further comprises a voltage-to-current converter connected between the first differential amplifier means and the first heater driver.

12. An apparatus as claimed in claim 1, in which said heater drive circuit means comprises a voltage-to-current converter connected between the first differential amplifier means and the heater means and a series connection of a heater driver and a reverse current flow preventing means, the series connection being connected between the second differential amplifier means and the heater means.

13. An apparatus as claimed in claim 1, further comprising an adder connected between the first differential amplifier means and the timer means for summing up the first and second differential output signals to produce a summation output signal which is applied to the timer means, said heater drive circuit means comprising a first heater drive connected between the timer means and the heater means and a series connection of a second heater driver and a reverse current flow preventing means, the series connection being connected between the second differential amplifier means and the heater means.

14. An apparatus as claimed in claim 13, in which said heater drive circuit means further comprises a current limiter connected between the first heater driver and the heater means.

15. An apparatus as claimed in claim 1, further comprising an adder connected between the first differential amplifier means and the heater drive circuit means for summing up the first and second differential output signals to produce a summation output signal, said heater drive circuit means comprising a first heater driver connected between the adder and the heater means and a series connection of a second heater driver and a reverse current flow preventing means, the series connection being connected between the second differential amplifier means and the heater means.

16. An apparatus as claimed in claim 15, in which said heater drive circuit means further comprises a current limiter connected between the first heater driver and the heater means.

17. An apparatus as claimed in claim 1, further comprising an adder connected between the first differential amplifier means and the heater drive circuit means for summing up the first and second differential output signals to produce a summation output signal, said heater drive circuit means comprising a voltage-to-current converter connected between the adder and the heater means and a series connection of a heater driver and a reverse current flow preventing means, the series connection being connected between the second differential amplifier means and the heater means.

18. An apparatus as claimed in claim 17, in which said heater drive circuit means further comprises a current limiter connected between the voltage-to-current converter and the heater means.

19. An apparatus as claimed in claim 1, further comprising an adder connected between the first differential amplifier means and the heater drive circuit means for summing up the first and second differential output signals to produce a summation output signal, said heater drive circuit means comprising a first series connection of a power amplifier and a first heater driver and a second series connection of a second heater driver and a reverse current flow preventing means, the first series connection being connected between the power amplifier and the heater means, the second series connection being connected between the second differential amplifier means and the heater means.

20. An apparatus as claimed in claim 1, further comprising an adder connected between the first differential amplifier means and the heater drive circuit means for summing up the first and second differential output signals to produce a summation output signal, said heater drive circuit means comprising a first series connection of a power amplifier and a current limiter and a second series connection of a heater driver and a reverse current flow preventing means, the first series connection being connected between the adder and the heater means, the second series connection being connected between the second differential amplifier means and the current limiter.

21. An apparatus as claimed in claim 1, further comprising an adder connected between the first differential amplifier means and the heater drive circuit means for summing up the first and second differential output signals to produce a summation output signal, said heater drive circuit means comprising a voltage-to-current converter connected between the adder and the heater means, and a series connection of a heater driver and a reverse current flow preventing means, the series connection being connected between the second differential amplifier means and the heater means.

22. An apparatus as claimed in claim 21, in which said heater driver circuit means further comprises a current limiter connected between the voltage-to-current converter and the heater means.

* * * * *